(12) United States Patent
Walker et al.

(10) Patent No.: US 10,327,044 B2
(45) Date of Patent: Jun. 18, 2019

(54) TIME SYNCHRONIZING OF DISTINCT VIDEO AND DATA FEEDS THAT ARE DELIVERED IN A SINGLE MOBILE IP DATA NETWORK COMPATIBLE STREAM

(71) Applicant: Quickplay Media Inc., Toronto (CA)

(72) Inventors: Torin Walker, Oakville (CA); Michael M. Martinez, San Diego, CA (US)

(73) Assignee: QUICKPLAY MEDIA INC., Toronto, Ontario (CA)

( * ) Notice: Subject to any disclaimer, the term of this patent is extended or adjusted under 35 U.S.C. 154(b) by 0 days.

(21) Appl. No.: 15/405,805

(22) Filed: Jan. 13, 2017

(65) Prior Publication Data
US 2017/0134830 A1    May 11, 2017

Related U.S. Application Data

(63) Continuation of application No. 13/917,078, filed on Jun. 13, 2013, now Pat. No. 9,571,902, which is a
(Continued)

(51) Int. Cl.
H04N 7/173    (2011.01)
H04N 21/8547    (2011.01)
(Continued)

(52) U.S. Cl.
CPC ....... *H04N 21/8547* (2013.01); *G06F 16/487* (2019.01); *G06F 16/739* (2019.01); *G06F 21/10* (2013.01); *G06Q 10/06* (2013.01); *G06Q 10/10* (2013.01); *G06Q 30/0244* (2013.01); *G06Q 30/0267* (2013.01); *G06Q 30/0269* (2013.01); *G06Q 30/0277* (2013.01); *H04H 20/26* (2013.01); *H04H 60/91* (2013.01); *H04L 65/4076* (2013.01); *H04L 65/4084* (2013.01); *H04L 65/602* (2013.01);
(Continued)

(58) Field of Classification Search
CPC ............. H04N 21/236; H04N 21/2365; H04N 21/242; H04N 21/2665
See application file for complete search history.

(56) References Cited

U.S. PATENT DOCUMENTS 4,999,806 A      3/1991   Chernow et al.
5,453,780 A  *  9/1995   Chen .................. H04N 7/15
                                                             348/14.01
(Continued)

FOREIGN PATENT DOCUMENTS

EP    1617588 A1    1/2006
EP    2486742 A1    8/2012
(Continued)

OTHER PUBLICATIONS

"U.S. Appl. No. 11/956,138, Non-Final Office Action dated Jan. 19, 2011", 30 pages.
(Continued)

*Primary Examiner* — James R Sheleheda
(74) *Attorney, Agent, or Firm* — Guntin & Gust, PLC; Jay Anderson

(57) ABSTRACT

Multiple video and/or content feeds are combined and synchronized in real-time into a single mobile IP data network compatible stream for presenting as a coherent display on a mobile device.

20 Claims, 8 Drawing Sheets

Related U.S. Application Data continuation-in-part of application No. 11/956,138, filed on Dec. 13, 2007, now Pat. No. 8,671,021, and a continuation-in-part of application No. 11/956,162, filed on Dec. 13, 2007, now Pat. No. 8,219,134, and a continuation-in-part of application No. 11/956,184, filed on Dec. 13, 2007, now abandoned, and a continuation-in-part of application No. 11/956,186, filed on Dec. 13, 2007, now Pat. No. 8,995,815, and a continuation-in-part of application No. 11/956,171, filed on Dec. 13, 2007, now Pat. No. 9,064,010, and a continuation-in-part of application No. 11/956,194, filed on Dec. 13, 2007, now Pat. No. 9,697,280, and a continuation-in-part of application No. 12/903,125, filed on Oct. 12, 2010, now Pat. No. 9,124,650, and a continuation-in-part of application No. 13/622,681, filed on Sep. 19, 2012.

(60) Provisional application No. 61/659,709, filed on Jun. 14, 2012, provisional application No. 61/785,491, filed on Mar. 14, 2013, provisional application No. 60/889,895, filed on Feb. 14, 2007, provisional application No. 60/869,889, filed on Dec. 13, 2006, provisional application No. 61/250,254, filed on Oct. 9, 2009, provisional application No. 61/536,470, filed on Sep. 19, 2011.

(51) Int. Cl.

| | | |
|---|---|---|
| *H04N 21/234* | (2011.01) | |
| *H04N 21/2365* | (2011.01) | |
| *G06F 16/487* | (2019.01) | |
| *G06F 16/738* | (2019.01) | |
| *H04L 29/06* | (2006.01) | |
| *H04L 29/08* | (2006.01) | |
| *G06F 21/10* | (2013.01) | |
| *G06Q 10/10* | (2012.01) | |
| *G06Q 30/02* | (2012.01) | |
| *H04H 20/26* | (2008.01) | |
| *H04H 60/91* | (2008.01) | |
| *H04N 21/414* | (2011.01) | |
| *H04N 21/61* | (2011.01) | |
| *H04N 21/6408* | (2011.01) | |
| *H04N 21/2187* | (2011.01) | |
| *H04N 21/2343* | (2011.01) | |
| *H04N 21/242* | (2011.01) | |
| *H04N 21/2665* | (2011.01) | |
| *G06Q 10/06* | (2012.01) | |
| *H04N 21/643* | (2011.01) | |

(52) U.S. Cl.
CPC .......... *H04L 65/605* (2013.01); *H04L 65/607* (2013.01); *H04L 65/80* (2013.01); *H04L 67/30* (2013.01); *H04N 21/2187* (2013.01); *H04N 21/2343* (2013.01); *H04N 21/2365* (2013.01); *H04N 21/23424* (2013.01); *H04N 21/242* (2013.01); *H04N 21/2665* (2013.01); *H04N 21/41407* (2013.01); *H04N 21/6112* (2013.01); *H04N 21/6125* (2013.01); *H04N 21/6131* (2013.01); *H04N 21/6408* (2013.01); *H04N 21/64322* (2013.01); *G06F 2221/0704* (2013.01); *H04L 65/1059* (2013.01)

(56) References Cited

U.S. PATENT DOCUMENTS

| | | | |
|---|---|---|---|
| 5,832,229 A | 11/1998 | Tomoda et al. | |
| 5,999,937 A | 12/1999 | Ellard | |
| 6,052,145 A | 4/2000 | MacRae et al. | |
| 6,119,101 A | 9/2000 | Peckover | |
| 6,333,750 B1 * | 12/2001 | Odryna | G06F 3/14 345/1.1 |
| 6,539,545 B1 * | 3/2003 | Dureau | H04N 7/17336 348/14.07 |
| 6,697,365 B1 | 2/2004 | Messenger et al. | |
| 6,704,576 B1 | 3/2004 | Brachman et al. | |
| 6,765,868 B1 | 7/2004 | Dunn et al. | |
| 6,842,580 B1 | 1/2005 | Ueda et al. | |
| 6,901,207 B1 | 5/2005 | Watkins et al. | |
| 6,954,741 B1 | 10/2005 | Brofman et al. | |
| 7,124,166 B2 | 10/2006 | Brown et al. | |
| 7,187,690 B2 | 3/2007 | Taylor et al. | |
| 7,222,297 B2 | 5/2007 | Wilson et al. | |
| 7,263,714 B2 | 8/2007 | Lowthert et al. | |
| 7,280,975 B1 | 10/2007 | Donner et al. | |
| 7,503,072 B2 | 3/2009 | Hughes et al. | |
| 7,581,166 B2 | 8/2009 | Wei et al. | |
| 7,583,288 B2 * | 9/2009 | Uyttendaele | H04N 5/23238 348/36 |
| 7,620,723 B2 | 11/2009 | Chen et al. | |
| 7,644,002 B2 | 1/2010 | Thumpudi et al. | |
| 7,644,108 B1 | 1/2010 | Malmskog et al. | |
| 7,805,338 B2 | 9/2010 | Kolls et al. | |
| 7,831,199 B2 | 11/2010 | Borchers et al. | |
| 7,870,089 B1 | 1/2011 | Hall, III et al. | |
| 7,917,434 B2 | 3/2011 | McGuirk et al. | |
| 7,921,157 B2 | 4/2011 | Brown et al. | |
| 7,995,756 B1 | 8/2011 | McKinney et al. | |
| 8,185,742 B2 | 5/2012 | Chang et al. | |
| 8,219,134 B2 | 7/2012 | MacNeil et al. | |
| 8,522,269 B2 | 8/2013 | Dharmaji | |
| 8,571,931 B2 | 10/2013 | Riedl et al. | |
| 8,625,754 B1 | 1/2014 | Croak et al. | |
| 8,671,021 B2 | 3/2014 | MacNeil et al. | |
| 8,719,090 B2 | 5/2014 | Lewis | |
| 8,786,670 B2 * | 7/2014 | Mauchly | H04N 7/15 348/14.12 |
| 8,805,270 B2 | 8/2014 | MacNeil et al. | |
| 8,855,469 B2 | 10/2014 | MacNeil et al. | |
| 8,874,748 B2 * | 10/2014 | Garrett | G06Q 20/10 709/226 |
| 8,880,677 B2 | 11/2014 | Julia et al. | |
| 8,892,761 B1 | 11/2014 | Zhang et al. | |
| 8,995,815 B2 | 3/2015 | MacNeil et al. | |
| 9,064,010 B2 | 6/2015 | MacNeil et al. | |
| 9,064,011 B2 | 6/2015 | Maharajh et al. | |
| 9,124,650 B2 | 9/2015 | Maharajh et al. | |
| 9,571,902 B2 * | 2/2017 | Walker | H04N 21/2343 |
| 9,697,280 B2 | 7/2017 | Maharajh et al. | |
| 2001/0034677 A1 | 10/2001 | Farhat et al. | |
| 2002/0032602 A1 | 3/2002 | Lanzillo, Jr. et al. | |
| 2002/0049727 A1 | 4/2002 | Rothkopf et al. | |
| 2002/0065074 A1 | 5/2002 | Cohn et al. | |
| 2002/0067376 A1 * | 6/2002 | Martin | G06Q 30/02 715/810 |
| 2002/0069218 A1 | 6/2002 | Sull et al. | |
| 2002/0069243 A1 | 6/2002 | Raverdy et al. | |
| 2002/0073419 A1 | 6/2002 | Yen et al. | |
| 2002/0124258 A1 | 9/2002 | Fritsch et al. | |
| 2002/0129374 A1 * | 9/2002 | Freeman | H04H 20/12 725/91 |
| 2002/0154777 A1 | 10/2002 | Candelore et al. | |
| 2002/0166122 A1 * | 11/2002 | Kikinis | H04N 5/44543 725/56 |
| 2002/0169540 A1 | 11/2002 | Engstrom et al. | |
| 2002/0186961 A1 | 12/2002 | Kikuchi et al. | |
| 2003/0014483 A1 | 1/2003 | Stevenson et al. | |
| 2003/0018613 A1 | 1/2003 | Oytac et al. | |
| 2003/0032409 A1 | 2/2003 | Hutcheson et al. | |
| 2003/0081836 A1 | 5/2003 | Averbuch et al. | |
| 2003/0083937 A1 | 5/2003 | Hasegawa et al. | |
| 2003/0093803 A1 | 5/2003 | Ishikawa et al. | |
| 2003/0110503 A1 | 6/2003 | Perkes et al. | |
| 2003/0130040 A1 * | 7/2003 | Dripps | A63F 13/12 463/42 |

(56) References Cited

U.S. PATENT DOCUMENTS

| | | | |
|---|---|---|---|
| 2003/0174154 A1* | 9/2003 | Yukie | G06F 17/30873 715/700 |
| 2003/0182393 A1 | 9/2003 | Tobin et al. | |
| 2003/0191659 A1 | 10/2003 | Okita et al. | |
| 2003/0195021 A1 | 10/2003 | Yamashita et al. | |
| 2003/0197785 A1* | 10/2003 | White | G11B 27/034 348/207.99 |
| 2003/0210891 A1 | 11/2003 | Burda et al. | |
| 2003/0217007 A1 | 11/2003 | Fukushima et al. | |
| 2003/0220835 A1 | 11/2003 | Barnes, Jr. et al. | |
| 2004/0019509 A1 | 1/2004 | Bekkers et al. | |
| 2004/0034874 A1 | 2/2004 | Hord et al. | |
| 2004/0115294 A1 | 6/2004 | Moran et al. | |
| 2004/0128282 A1 | 7/2004 | Kleinberger et al. | |
| 2004/0158855 A1 | 8/2004 | Gu et al. | |
| 2004/0166834 A1 | 8/2004 | Omar et al. | |
| 2004/0184523 A1* | 9/2004 | Dawson | H04N 7/17318 375/240.1 |
| 2004/0193648 A1 | 9/2004 | Lai et al. | |
| 2004/0195310 A1 | 10/2004 | Silverbrook et al. | |
| 2004/0221304 A1 | 11/2004 | Sparrell et al. | |
| 2004/0226034 A1 | 11/2004 | Kaczowka et al. | |
| 2004/0268413 A1 | 12/2004 | Reid et al. | |
| 2005/0015246 A1 | 1/2005 | Thumpudi et al. | |
| 2005/0015259 A1 | 1/2005 | Thumpudi et al. | |
| 2005/0034155 A1* | 2/2005 | Gordon | H04N 5/4401 725/39 |
| 2005/0060742 A1 | 3/2005 | Riedl et al. | |
| 2005/0071782 A1* | 3/2005 | Barrett | H04N 5/45 715/838 |
| 2005/0097624 A1 | 5/2005 | Salo et al. | |
| 2005/0113066 A1 | 5/2005 | Hamberg et al. | |
| 2005/0114512 A1 | 5/2005 | Ketkar et al. | |
| 2005/0125533 A1 | 6/2005 | Svanbro et al. | |
| 2005/0128995 A1 | 6/2005 | Ott et al. | |
| 2005/0138165 A1 | 6/2005 | Tang et al. | |
| 2005/0152449 A1 | 7/2005 | Nemiroff et al. | |
| 2005/0153650 A1 | 7/2005 | Hikomoto et al. | |
| 2005/0170809 A1 | 8/2005 | Lucidarme et al. | |
| 2005/0172154 A1 | 8/2005 | Short et al. | |
| 2005/0180341 A1* | 8/2005 | Nelson | H04N 7/147 370/260 |
| 2005/0182791 A1 | 8/2005 | Lim et al. | |
| 2005/0204381 A1 | 9/2005 | Ludvig et al. | |
| 2005/0210498 A1 | 9/2005 | Scott et al. | |
| 2005/0228807 A1 | 10/2005 | McCauley et al. | |
| 2005/0233693 A1 | 10/2005 | Karaoguz et al. | |
| 2005/0239495 A1 | 10/2005 | Bayne et al. | |
| 2005/0246193 A1 | 11/2005 | Roever et al. | |
| 2005/0246758 A1 | 11/2005 | Khandelwal et al. | |
| 2005/0266851 A1 | 12/2005 | Kouno | |
| 2006/0004770 A1 | 1/2006 | Nakano et al. | |
| 2006/0015908 A1 | 1/2006 | Vermola et al. | |
| 2006/0031551 A1 | 2/2006 | Agresta et al. | |
| 2006/0068806 A1 | 3/2006 | Nam et al. | |
| 2006/0085561 A1 | 4/2006 | Manasse et al. | |
| 2006/0098597 A1 | 5/2006 | Kurzmann et al. | |
| 2006/0128370 A1 | 6/2006 | Tahara | |
| 2006/0146124 A1 | 7/2006 | Pepperell et al. | |
| 2006/0146796 A1 | 7/2006 | Joseph et al. | |
| 2006/0146824 A1 | 7/2006 | Miyata | |
| 2006/0146854 A1 | 7/2006 | Park et al. | |
| 2006/0154601 A1 | 7/2006 | Tewalt et al. | |
| 2006/0195441 A1 | 8/2006 | Julia et al. | |
| 2006/0218611 A1 | 9/2006 | Son et al. | |
| 2006/0248559 A1 | 11/2006 | Michener et al. | |
| 2006/0271982 A1 | 11/2006 | Gallou et al. | |
| 2006/0287916 A1 | 12/2006 | Starr | |
| 2007/0002858 A1 | 1/2007 | Bichot et al. | |
| 2007/0019311 A1* | 1/2007 | Stricek | G03B 37/04 359/864 |
| 2007/0033531 A1 | 2/2007 | Marsh et al. | |
| 2007/0044123 A1 | 2/2007 | Zriny et al. | |
| 2007/0060129 A1 | 3/2007 | Ramer et al. | |
| 2007/0061198 A1 | 3/2007 | Ramer et al. | |
| 2007/0061245 A1 | 3/2007 | Ramer et al. | |
| 2007/0073834 A1 | 3/2007 | Charlebois et al. | |
| 2007/0081586 A1 | 4/2007 | Raveendran et al. | |
| 2007/0088801 A1 | 4/2007 | Levkovitz et al. | |
| 2007/0089151 A1 | 4/2007 | Moore et al. | |
| 2007/0107016 A1 | 5/2007 | Angel et al. | |
| 2007/0124818 A1 | 5/2007 | Bumiller et al. | |
| 2007/0130015 A1 | 6/2007 | Starr et al. | |
| 2007/0136247 A1 | 6/2007 | Vigil et al. | |
| 2007/0155307 A1 | 7/2007 | Ng et al. | |
| 2007/0157242 A1 | 7/2007 | Cordray et al. | |
| 2007/0157248 A1 | 7/2007 | Ellis et al. | |
| 2007/0162951 A1 | 7/2007 | Rashkovskiy et al. | |
| 2007/0192782 A1 | 8/2007 | Ramaswamy et al. | |
| 2007/0201502 A1 | 8/2007 | Abramson et al. | |
| 2007/0204311 A1 | 8/2007 | Hasek et al. | |
| 2007/0208718 A1 | 9/2007 | Javid et al. | |
| 2007/0216760 A1 | 9/2007 | Kondo et al. | |
| 2007/0220575 A1 | 9/2007 | Cooper et al. | |
| 2007/0226365 A1 | 9/2007 | Hildreth et al. | |
| 2007/0254619 A1 | 11/2007 | Salomone et al. | |
| 2007/0255801 A1 | 11/2007 | Adler et al. | |
| 2007/0268164 A1 | 11/2007 | Lai et al. | |
| 2007/0270163 A1 | 11/2007 | Anupam et al. | |
| 2007/0271578 A1 | 11/2007 | Thenthiruperai et al. | |
| 2007/0274376 A1 | 11/2007 | Jang et al. | |
| 2007/0293198 A1 | 12/2007 | Sanmugasuntharam et al. | |
| 2008/0040743 A1 | 2/2008 | Dharmaji et al. | |
| 2008/0083003 A1 | 4/2008 | Biniak et al. | |
| 2008/0084867 A1 | 4/2008 | Foti et al. | |
| 2008/0086456 A1 | 4/2008 | Rasanen et al. | |
| 2008/0088735 A1 | 4/2008 | Biniak et al. | |
| 2008/0092157 A1 | 4/2008 | Walter et al. | |
| 2008/0133716 A1 | 6/2008 | Rao et al. | |
| 2008/0146272 A1 | 6/2008 | Rao et al. | |
| 2008/0155635 A1 | 6/2008 | Johnson et al. | |
| 2008/0162451 A1 | 7/2008 | Garrison et al. | |
| 2008/0162623 A1 | 7/2008 | Flynn et al. | |
| 2008/0163059 A1* | 7/2008 | Craner | H04N 5/44543 715/719 |
| 2008/0195664 A1 | 8/2008 | Maharajh et al. | |
| 2008/0200153 A1 | 8/2008 | Fitzpatrick et al. | |
| 2008/0200154 A1 | 8/2008 | Maharajh et al. | |
| 2008/0201225 A1 | 8/2008 | Maharajh et al. | |
| 2008/0201386 A1 | 8/2008 | Maharajh et al. | |
| 2008/0207137 A1 | 8/2008 | Maharajh et al. | |
| 2008/0207182 A1 | 8/2008 | Maharajh et al. | |
| 2008/0209480 A1 | 8/2008 | Eide et al. | |
| 2008/0235200 A1 | 9/2008 | Washington et al. | |
| 2008/0288771 A1 | 11/2008 | Kulakowski et al. | |
| 2008/0311885 A1 | 12/2008 | Dawson et al. | |
| 2008/0320545 A1* | 12/2008 | Schwartz | H04N 7/17318 725/135 |
| 2009/0019509 A1 | 1/2009 | Horn et al. | |
| 2009/0049097 A1 | 2/2009 | Nocifera et al. | |
| 2009/0083816 A1 | 3/2009 | St | |
| 2009/0094119 A1 | 4/2009 | Shkedi et al. | |
| 2009/0232165 A1 | 9/2009 | Ishida et al. | |
| 2009/0286560 A1 | 11/2009 | Willis et al. | |
| 2009/0300185 A1 | 12/2009 | Letellier et al. | |
| 2010/0033632 A1 | 2/2010 | Tsukagoshi | |
| 2010/0158479 A1* | 6/2010 | Craner | H04N 7/17318 386/241 |
| 2010/0180297 A1* | 7/2010 | Levine | H04N 5/45 725/38 |
| 2011/0004892 A1 | 1/2011 | Dharmaji et al. | |
| 2011/0043600 A1* | 2/2011 | Gopal | H04L 12/1881 348/14.09 |
| 2011/0066730 A1 | 3/2011 | Julia et al. | |
| 2011/0116760 A1 | 5/2011 | Gilley et al. | |
| 2011/0125608 A1 | 5/2011 | Hirsch et al. | |
| 2011/0225417 A1 | 9/2011 | Maharajh et al. | |
| 2011/0302442 A1* | 12/2011 | Garrett | G06Q 20/10 713/400 |
| 2012/0069137 A1* | 3/2012 | Thapa | H04N 7/15 348/14.08 |

(56) References Cited

U.S. PATENT DOCUMENTS

| | | | |
|---|---|---|---|
| 2012/0189273 A1* | 7/2012 | Folgner | H04N 9/8227 386/241 |
| 2012/0208512 A1 | 8/2012 | Maharajh et al. | |
| 2012/0210348 A1 | 8/2012 | Verna et al. | |
| 2012/0257112 A1* | 10/2012 | Fritsch | H04N 7/15 348/580 |
| 2012/0317302 A1* | 12/2012 | Silvestri | H04L 65/4076 709/231 |
| 2013/0064527 A1 | 3/2013 | Maharajh et al. | |
| 2013/0188932 A1* | 7/2013 | Hartley | H04N 9/87 386/282 |
| 2013/0216206 A1* | 8/2013 | Dubin | H04N 9/87 386/282 |
| 2013/0272431 A1* | 10/2013 | Baird | H04N 7/152 375/240.26 |
| 2014/0033252 A1* | 1/2014 | Radloff | H04N 5/445 725/35 |
| 2014/0064701 A1* | 3/2014 | Woodman | H04N 5/765 386/241 |
| 2014/0092254 A1* | 4/2014 | Mughal | G11B 27/031 348/158 |
| 2014/0123014 A1* | 5/2014 | Keen | H04L 51/046 715/719 |
| 2014/0126651 A1* | 5/2014 | Erickson | H04N 21/4307 375/240.25 |
| 2014/0164636 A1* | 6/2014 | Silvestri | H04L 67/325 709/231 |
| 2014/0184908 A1* | 7/2014 | Perumanam | H04N 5/04 348/512 |
| 2014/0258469 A1 | 9/2014 | Maharajh et al. | |
| 2014/0316903 A1 | 10/2014 | Maharajh et al. | |
| 2014/0317112 A1 | 10/2014 | Maharajh et al. | |
| 2014/0325030 A1 | 10/2014 | Maharajh et al. | |
| 2014/0342659 A1 | 11/2014 | Maharajh et al. | |
| 2015/0019550 A1 | 1/2015 | Maharajh et al. | |
| 2015/0078247 A1 | 3/2015 | Maharajh et al. | |
| 2015/0087224 A1 | 3/2015 | Maharajh et al. | |
| 2015/0128040 A1* | 5/2015 | Nielsen | G11B 27/102 715/716 |
| 2015/0149655 A1 | 5/2015 | Dingle et al. | |
| 2015/0150046 A1 | 5/2015 | Maharajh et al. | |
| 2015/0163379 A1* | 6/2015 | Herzog | H04N 21/8547 348/500 |
| 2017/0162023 A1 | 6/2017 | Hunter et al. | |
| 2017/0277701 A1 | 9/2017 | Maharajh et al. | |
| 2018/0357248 A1 | 12/2018 | Maharajh et al. | |
| 2018/0365250 A1 | 12/2018 | Maharajh et al. | |

FOREIGN PATENT DOCUMENTS

| | | | |
|---|---|---|---|
| EP | 2177010 | A4 | 10/2012 |
| JP | 2004297628 | A | 10/2004 |
| WO | 2006110322 | A2 | 10/2006 |
| WO | 2006113975 | A1 | 11/2006 |
| WO | 2008072093 | A2 | 6/2008 |
| WO | 2008125861 | A2 | 10/2008 |
| WO | 2011041916 | A1 | 4/2011 |
| WO | 2013040708 | A1 | 3/2013 |

OTHER PUBLICATIONS 07872056.2, "European Application Serial No. 07872056.2, Extended European Search Report dated Sep. 19, 2012", 14 pages.

U.S. Appl. No. 11/956,138, "U.S. Appl. No. 11/956,138, Non Final Office Action dated Jan. 19, 2011", 30 pages.

U.S. Appl. No. 11/956,162, "U.S. Appl. No. 11/956,162, Non Final Office Action dated Jan. 6, 2011", 13 pages.

U.S. Appl. No. 11/956,171, "U.S. Appl. No. 11/956,171, Non-Final Office Action dated Nov. 14, 2011", 21 pages.

U.S. Appl. No. 11/956,184, "U.S. Appl. No. 11/956,184, Non Final Office Action dated Oct. 4, 2010", 19 pages.

U.S. Appl. No. 11/956,184, "US PTO, Office Action for related U.S. Appl. No. 11/956,184, entitled "Automated Content Tag Processing for Mobile Media", Office Action dated Mar. 18, 2010.", 17 pages.

U.S. Appl. No. 11/956,194, "US PTO, Office Action for related U.S. Appl. No. 11/956,194, entitled "Mediation and Settlement for Mobile Media", Office Action dated Nov. 10, 2010", 18 pages.

U.S. Appl. No. 12/418,576, "USPTO, Office Action for related U.S. Appl. No. 12/418,576, entitled "Progressive Download Playback", Office Action dated Dec. 22, 2010.", 15 pages.

12833936.3, "European Application Serial No. 12833936.3, European Extended Search Report dated Sep. 23, 2015", Quickplay Media Inc., 8 Pages.

Einarsson, et al., "Multiple aggregated control URIs for RTSP", http://tools.ietf.org/id/draft-einarsson-mmusic-rtsp-macuri-OO.txt, Network Working Group, Internet-Draft, <draft-einarsson-mmusic-rtspmacuri-00> Jun. 19, 2006, 12 pages.

PCT/CA2010/001636, "International Application Serial No. PCT/CA2010/001636, International Preliminary Report on Patentability, dated Apr. 19, 2012", 7 pages.

PCT/CA2010/001636, "International Application Serial No. PCT/CA2010/001636, International Search Report and Written Opinion dated Feb. 8, 2011", 8 pages.

PCT/CA2012/050654, "International Application Serial No. PCT/CA2012/050654, International Preliminary Report on Patentability with Written Opinion dated Apr. 3, 2014", Quickplay Media Inc., 9 Pages.

PCT/CA2012/050654, International Application Serial No. PCT/CA2012/050654, International Search Report and Written Opinion dated Feb. 18, 2013, Quickplay Media Inc., 13 pages.

PCT/IB2007/004401, "International Application Serial No. PCT/IB2007/004401, International Search Report dated Aug. 18, 2008", 7 pages.

Steck, Chris "Delivering Total Mobile TV", URL :http://docs.real.com/docs/industries/DeliveringTotalMobileTV.pdf, XP002482031, retrieved on May 20, 2008, pp. 5-10, Apr. 1-12, 2006.

10821541.9, European Application Serial No. 10821541.9, European Extended Search Report, Quickplay Media Inc., dated Oct. 7, 2014, 3 pages.

U.S. Appl. No. 11/956,186, "U.S. Appl. No. 11/956,186, Restriction Requirement dated Jun. 28, 2012", Kavi Maharajh, 5.

Baek, et al., "Efficient Multi-receiver Identity-Based Encryption and Its Application to Broadcast Encryption", Public 9 Key Cryptography, PKC 2005: 8th International Workshop on Theory and Practice in Public Key Cryptography, Les Diablerets, Switzerland, Lecture Notes in Computer Science (LNCS), vol. 3386, Springer, Berlin, 18 pgs, Jan. 23, 2005, 380-397.

* cited by examiner

TIME SYNCHRONIZING OF DISTINCT VIDEO AND DATA FEEDS THAT ARE DELIVERED IN A SINGLE MOBILE IP DATA NETWORK COMPATIBLE STREAM

CLAIM OF PRIORITY

This application is a continuation of U.S. application Ser. No. 13/917,078 filed on Jun. 13, 2013.

U.S. application Ser. No. 13/917,078 claims the benefit of U.S. Provisional Application Ser. No. 61/659,709 filed on Jun. 14, 2012, and U.S. Provisional Application Ser. No. 61/785,491 filed on Mar. 14, 2013, each of which are hereby incorporated herein by reference in their entirety.

U.S. application Ser. No. 13/917,078 is a continuation-in-part of U.S. Nonprovisional application Ser. No. 11/956,138 entitled CONSUMPTION PROFILE FOR MOBILE MEDIA, filed Dec. 13, 2007, now U.S. Pat. No. 8,671,021, which claims priority to U.S. Provisional Application Ser. No. 60/889,895 entitled MOBILE MEDIA PLATFORM, filed Feb. 14, 2007, and U.S. Provisional Application Ser. No. 60/869,889 entitled MOBILE MEDIA PLATFORM, filed Dec. 13, 2006, each of which are hereby incorporated herein by reference in their entirety.

U.S. application Ser. No. 13/917,078 is also a continuation-in-part of U.S. Nonprovisional application Ser. No. 11/956,162 entitled SEAMLESSLY SWITCHING AMONG UNICAST, MULTICAST, AND BROADCAST MOBILE MEDIA CONTENT, filed Dec. 13, 2007, now U.S. Pat. No. 8,219,134, which claims priority to U.S. Provisional Application Ser. No. 60/889,895 entitled MOBILE MEDIA PLATFORM, filed Feb. 14, 2007, and U.S. Provisional Application Ser. No. 60/869,889 entitled MOBILE MEDIA PLATFORM, filed Dec. 13, 2006, each of which are hereby incorporated herein by reference in their entirety.

U.S. application Ser. No. 13/917,078 is also a continuation-in-part of U.S. Nonprovisional application Ser. No. 11/956,184 entitled AUTOMATED CONTENT TAG PROCESSING FOR MOBILE MEDIA, filed Dec. 13, 2007, now abandoned, which claims priority to U.S. Provisional Application Ser. No. 60/889,895 entitled MOBILE MEDIA PLATFORM, filed Feb. 14, 2007 and U.S. Provisional Application Ser. No. 60/869,889 entitled MOBILE MEDIA PLATFORM, filed Dec. 13, 2006, each of which are hereby incorporated herein by reference in their entirety.

U.S. application Ser. No. 13/917,078 is also a continuation-in-part of U.S. Nonprovisional application Ser. No. 11/956,186 entitled MOBILE MEDIA PAUSE AND RESUME, filed Dec. 13, 2007 which claims priority to U.S. Provisional Application Ser. No. 60/889,895 entitled MOBILE MEDIA PLATFORM, filed Feb. 14, 2007, and U.S. Provisional Application Ser. No. 60/869,889 entitled MOBILE MEDIA PLATFORM, filed Dec. 13, 2006, each of which are hereby incorporated herein by reference in their entirety.

U.S. application Ser. No. 13/917,078 is also a continuation-in-part of U.S. Nonprovisional application Ser. No. 11/956,171 entitled ENCODING AND TRANSCODING FOR MOBILE MEDIA, filed Dec. 13, 2007, now U.S. Pat. No. 9,064,010, which claims priority to U.S. Provisional Application Ser. No. 60/889,895 entitled MOBILE MEDIA PLATFORM, filed Feb. 14, 2007, and U.S. Provisional Application Ser. No. 60/869,889 entitled MOBILE MEDIA PLATFORM, filed Dec. 13, 2006, each of which are hereby incorporated herein by reference in their entirety.

U.S. application Ser. No. 13/917,078 is also a continuation-in-part of U.S. Nonprovisional application Ser. No. 11/956,194 entitled MEDIATION AND SETTLEMENT FOR MOBILE MEDIA, filed Dec. 13, 2007 which claims priority to U.S. Provisional Application Ser. No. 60/889,895 entitled MOBILE MEDIA PLATFORM, filed Feb. 14, 2007 and U.S. Provisional Application Ser. No. 60/869,889 entitled MOBILE MEDIA PLATFORM, filed Dec. 13, 2006 each of which are hereby incorporated herein by reference in their entirety.

U.S. application Ser. No. 13/917,078 is a continuation-in-part of U.S. application Ser. No. 12/903,125 entitled DIGITAL RIGHTS MANAGEMENT FOR A MOBILE MEDIA PLATFORM, filed Oct. 12, 2010, now U.S. Pat. No. 9,124,650, which claims priority to U.S. Provisional Application Ser. No. 61/250,254, entitled DIGITAL RIGHTS MANAGEMENT FOR A MOBILE MEDIA PLATFORM, filed Oct. 9, 2009, each of which are hereby incorporated herein by reference in their entirety.

U.S. application Ser. No. 13/917,078 is also a continuation-in-part of U.S. Nonprovisional application Ser. No. 13/622,681 entitled MEDIA PROCESSOR, filed Sep. 19, 2012 which claims priority to U.S. Provisional Application Ser. No. 61/536,470, entitled MEDIA PROCESSOR, filed Sep. 19, 2011, each of which are hereby incorporated herein by reference in their entirety.

CROSS-REFERENCE TO RELATED APPLICATIONS

U.S. application Ser. No. 13/917,078 incorporates by reference, in its entirety, U.S. Nonprovisional application Ser. No. 12/418,576 entitled PROGRESSIVE DOWNLOAD PLAYBACK, filed Apr. 4, 2009.

BACKGROUND

Field

The present invention is related to synchronizing multiple data feeds for optimized transmission and presentation on a mobile device display.

Description of the Related Art

Multi-feed streaming, such as picture in picture and for providing leaderboard information for display on a mobile device along with a video of a live event presents challenges to network bandwidth demand and responsiveness to user selection of the individual feeds. In addition, a mobile device user often is unable to select how he would like to receive such multiple data feeds when such feeds may be delayed with respect to one another. Also, coherent display of multiple related feeds that are not synchronized generally cause poor user experience.

SUMMARY

Techniques and applications for delivering multiple video/audio feeds to a mobile device in one stream to be displayed as a Mosaic on one screen are described herein. A device user is enabled to select the audio of any streamed feed in the Mosaic view or can select to display just one of the video feeds in the space of the mosaic. Although mobile device examples are used throughout, the methods and systems described herein may be similarly applied to other types of displays including mobile OS enabled TVs (e.g. APPLE TV, GOOGLE TV) and the like. In addition, although the examples herein are for touch screen type devices, display devices with other user input capabilities (mouse, touch pad, laser pointer, and the like) may be used herein as well.

The methods and systems described herein may include time synchronized distinct video feeds (aka channels) in a single mobile device compatible stream that may include a device specific stream, a video player-specific stream, a Dynamic Adaptive Streaming over HTTP (DASH)-based stream, and the like. The methods and systems described herein may alternatively include time synchronization of a portion of a set of distinct video feeds in a single mobile device compatible stream so that real-time or "live" feeds may be synchronized.

The methods and systems described herein may include time synchronized video feeds in a single mobile device compatible audio/video stream.

The methods and systems described herein may include time synchronizing distinct video feeds for delivery to a mobile device via a single audio/video stream.

The methods and systems described herein may include time synchronizing distinct video feeds that are received at a mobile device as a single audio/video stream for presentation to the user. In such an embodiment synchronization may occur on the mobile device based on time-related data provided in a side channel and/or metadata associated with the single stream.

The methods and systems described herein may include unified display of distinct video feeds transmitted via a single audio/video stream over a mobile device data network. The single audio/video stream may comprise any number of distinct video feeds and a single audio feed of one of the distinct video feeds.

The methods and systems described herein may include selectively displaying on a mobile device one or more time synchronized distinct video feeds transmitted in a single audio/video stream. The selection may be automatic and may be based on location of the mobile device, content subscription associated with the mobile device, identification of a network carrier providing service to the mobile device, and the like. In such an embodiment, it may be envisioned that the mobile device may receive all of the distinct feeds as one stream and may select a subset of feeds to be presented to the user as described above.

The methods and systems described herein may include time synchronizing select video feeds from a plurality of available video feeds and encoding the select video feeds into a single mobile device compatible stream. Selection may be based on location of a mobile device that requests streaming of at least one of the select video feeds The methods and systems described herein may include receiving distinct video/audio feeds including meta data for time synchronizing the distinct feeds into a single mobile-device compatible stream.

Methods and systems described herein may include presenting a multi-view display in a portion of a device screen of a plurality of feeds that have been delivered to a mobile device as a single mobile IP data network compatible stream; and in response to a user action associated with the multi-view display, presenting a new view of content from at least one of the plurality of feeds. The user action may be a selection via a user interface of the mobile device of a portion of the multi-view display that includes content from a single feed. The new view may include a single feed that covers substantially the entire multi-view portion of the device screen.

The methods and systems described herein for streaming a plurality of video feeds as a single mobile IP data network compatible stream and facilitating user interaction with the plurality of feeds via a coherent display of at least a portion of the video feeds may utilize the features and functionality described in co-pending applications incorporated herein by reference. Features and functions described the co-pending applications incorporated herein by reference, such as ingestion, encoding/transcoding, mediation, pause and resume, seamless switching among unicast/multicast/broadcast, preparation and use of a consumption profile, automated content tagging, and the like may be used to identify, ingest, aggregate, stream, and facilitate user interaction with a plurality of feeds that may include video, audio, content, and the like.

The methods and systems described herein may include accessing with a server a plurality of distinct video feeds. The method further includes accessing time stamp information for at least a portion of the plurality of distinct video feeds. The method further includes comparing each time stamp information to a reference clock to determine a relative order of, and a relative time difference among, the portion of the plurality of distinct video feeds. The method further includes determining a synchronizing point in each of the plurality of distinct video feeds at which each feed may be synchronized relative to the reference clock. The method further includes combining the plurality of distinct video feeds to form a single video stream comprising a plurality of synchronized distinct video feeds based on the synchronizing point. The method may further include encoding the single video stream to form a composite mobile device compatible stream. The method may further include combining comprises at least one of interleaving, multiplexing, and concatenating. The combining may include delaying at least one of the plurality of distinct video feeds so that the delayed at least one of the plurality of distinct video feeds may be time synchronized with at least one other of the plurality of distinct video feeds. The step of combining the plurality of distinct video feeds may include sub-sampling each of the distinct video feeds so that the composite mobile device compatible stream takes no more bandwidth than one of the distinct video feeds. The stream may be one of a device specific stream, a video player-specific stream, and a DASH-based stream. The at least one of the distinct video feeds may include a live event feed. The time stamp information for the live event feed may be the reference clock, and wherein the plurality of distinct video feeds may be synchronized to the reference clock. The single video stream may include a plurality of synchronized distinct video feeds may be an internet protocol stream that may include metadata for each of the distinct video feeds. The metadata may facilitate converting the single video stream into the distinct video feeds for presentation on a mobile device screen. The metadata may facilitate identifying each of the distinct video feeds to a user interface application of a mobile device on which the distinct video feeds are being presented. The single video stream may include a plurality of synchronized distinct video feeds that may include a mosaic of the plurality of the distinct video feeds. The single video stream may include a mosaic that includes position information within the mosaic of each distinct video feeds. The single video stream may include a plurality of synchronized distinct video feeds that may include a single audio feed associated with one of the plurality of synchronized distinct video feeds.

The methods and systems described herein may include accessing with a server a plurality of distinct feeds. The method may include accessing a feed clock associated with a source of at least one of the plurality of distinct feeds. The method may include accessing a reference clock. The method may include comparing the feed clock to the reference clock to determine latency between the at least one of the portion of the plurality of distinct feeds and the reference clock. The method may include determining a synchronizing point in each of the plurality of distinct feeds based on the determined latency at which each may be synchronized relative to the reference clock. The method may include aligning the synchronizing poit in each of the plurality of distinct feeds to facilitate delivery of synchronized feeds. The method may include combining the plurality of distinct feeds to form a single stream including a plurality of synchronized distinct feeds, based on the determined synchronizing point. In an example, a synchronization point may be a video frame. The method further includes encoding the single stream to form a composite mobile device compatible stream. The step of combining comprises at least one of interleaving, multiplexing, and concatenating. The step of combining comprises delaying at least one of the plurality of distinct feeds so that the delayed at least one of the plurality of distinct feeds may be time synchronized with at least one other of the plurality of distinct feeds. The step of combining the plurality of distinct feeds includes sub-sampling each of the distinct feeds so that the composite mobile device compatible stream takes no more bandwidth than one of the distinct feeds. The stream may be one of a device specific stream, a player-specific stream, and a DASH-based stream. The at least one of the distinct feeds comprises a live event feed. The time stamp information for the live event feed may be the reference clock, and wherein the plurality of distinct feeds may be synchronized to the reference clock. The single stream comprising a plurality of synchronized distinct feeds may be an internet protocol stream that comprises metadata for each of the distinct feeds. The single stream comprising a plurality of synchronized distinct feeds comprises a mosaic of the plurality of the distinct video feeds. The single stream comprising a mosaic further comprises position information within the mosaic of each distinct feed. The single stream comprising a plurality of distinct feeds further comprises a plurality of video feeds and a single audio feed associated with one of the plurality of video feeds.

The methods and systems described herein may include a method including receiving a single stream comprising a plurality of distinct feeds. The method may include receiving distinct feed data time information in a side channel associated with the stream. The method may include comparing the time information for each of the distinct feeds to determine a relative order of, and a relative time difference among, the plurality of distinct feeds. The method further includes determining a synchronizing point in each of the plurality of distinct feeds at which each may be synchronized. The method further includes presenting the plurality of distinct feeds synchronized in time based on the synchronizing point. The synchronizing point in each of the plurality of distinct feeds may be associated with a single time value. The step of presenting includes delaying at least one of the plurality of distinct feeds so that the delayed at least one of the plurality of distinct feeds may be time synchronized with at least one other of the plurality of distinct feeds. The single stream may be presented as a mosaic of the plurality of the distinct video feeds. The single stream further includes mosaic position information for each distinct video feed. The single stream includes a plurality of distinct feeds further comprises a plurality of video feeds and a single audio feed associated with one of the plurality of video feeds.

The methods and systems described herein may include presenting a multi-view display, in a portion of a device screen, of a plurality of feeds that may have been delivered to a mobile device as a single mobile internet protocol data network compatible stream. The method includes presenting in response to a user action associated with the multi-view display, a new view of content from at least one of the plurality of feeds. The plurality of feeds may include a plurality of time synchronized distinct video feeds. The plurality of feeds may include a plurality of distinct video feeds and time information for synchronizing the plurality of feeds. The time information may be carried in a side channel of the single mobile internet protocol data network compatible stream. The user action may include a selection via a user interface of the mobile device of a portion of the multi-view display that may include content from the at least one of the plurality of feeds. The new view may include a single feed of the plurality of feeds that may cover substantially the entire multi-view display on the device screen.

The methods and systems described herein may include receiving a plurality of feeds from a live event, wherein each feed may be associated with a feed-specific time stamp. The method includes providing in a user interface of a mobile device that may be receiving the feeds at least one interface feature that facilitates selecting between holding presentation of a portion of the plurality of feeds until an equivalent time stamp from all of the plurality of feeds may be received and presenting at least one of the plurality of feeds when it may be received. The plurality of feeds from a live event includes at least one video feed of the live event and a data feed derived from events at the live event. The data feed may include event real-time properties data. The at least one of the plurality of feeds to be presented when it may be received may be the data feed derived from events at the live event. The method further includes providing in the user interface at least one interface feature that may facilitate selecting between holding presentation of at least one of the plurality of feeds until an equivalent time stamp from at least one other of the plurality of feeds may be received and presenting at least one of the plurality of feeds when it may be received.

The methods and systems described herein may include receiving a plurality of distinct video feeds and video feed time information that may facilitate determining a relative order of the distinct video feeds. The method further includes combining the plurality of distinct video feeds in the relative order. The method further includes generating a mobile device compatible stream from the ordered, combined plurality of distinct video feeds by processing the ordered, combined plurality of distinct video feeds with a mobile device compatible encoder. The step of combining may include at least one of interleaving, multiplexing, and concatenating. The step of combining may include delaying at least one of the plurality of distinct video feeds so that the delayed at least one of the plurality of distinct video feeds may be time synchronized with at least one other of the plurality of distinct video feeds.

The methods and systems described herein may include accessing with a server a plurality of distinct video feeds comprising a sequence of video frames. The method further includes accessing time stamp information for at least a portion of the plurality of distinct video feeds. The method further includes comparing each of the time stamp information to a reference clock to determine a relative order of, and a relative time difference among, the portion of the plurality of distinct video feeds. The method further includes determining a synchronizing frame in each of the plurality of distinct video feeds at which each may be synchronized relative to the reference clock. The method further includes combining the video frames of the plurality of distinct video feeds to form a single video stream comprising a plurality of synchronized distinct video feeds based on the determined synchronizing frame. The method further includes encoding the video frames of the single video stream to form a composite mobile device compatible stream. The step of combining may include at least one of interleaving, multiplexing, and concatenating. The step of combining may include delaying at least one of the plurality of distinct video feeds so that the delayed at least one of the plurality of distinct video feeds may be time synchronized with at least one other of the plurality of distinct video feeds. The step of combining the video frames of the plurality of distinct video feeds includes sub-sampling each of the distinct video feeds so that the composite mobile device compatible stream takes no more bandwidth than one of the distinct video feeds. The stream may be one of a device specific stream, a video player-specific stream, and a DASH-based stream. The at least one of the distinct video feeds comprises a live event feed. The time stamp information for the live event feed may be the reference clock. The plurality of distinct video feeds may be synchronized to the reference clock. The single video stream may include a plurality of synchronized distinct video feeds may be an internet protocol stream that comprises metadata for each of the distinct video feeds. The metadata facilitates converting the single video stream into the distinct video feeds for presentation on a mobile device screen. The metadata facilitates identifying each of the distinct video feeds to a user interface application of a mobile device on which the distinct video feeds may have been presented. The single video stream may include a plurality of synchronized distinct video feeds includes a mosaic of the plurality of the distinct video feeds. The single video stream may include a mosaic further including position information within the mosaic of each distinct video feed. The single video stream may include a plurality of synchronized distinct video feeds further including a single audio feed associated with one of the plurality of synchronized distinct video feeds.

The methods and systems described herein may include receiving a plurality of distinct feeds comprising at least one of audio and video and feed time information that may facilitate determining a relative order of the distinct feeds. The method further includes combining the plurality of distinct feeds in the relative order. The method further includes generating a mobile device compatible stream from the ordered, combined plurality of distinct feeds by processing the ordered, combined plurality of distinct feeds with a mobile device compatible encoder. The step of combining may include at least one of interleaving, multiplexing, and concatenating.

The methods and systems described herein may include accessing with a server a plurality of distinct feeds comprising at least one of audio and video. The method includes accessing time stamp information for at least a portion of the plurality of distinct feeds. The method further includes comparing each of the time stamp information to a reference clock to determine a relative order of, and a relative time difference among, the portion of the plurality of distinct feeds. The method further includes determining a synchronizing point in each of the plurality of distinct feeds at which each may be synchronized relative to the reference clock. The method further includes combining the plurality of distinct feeds to form a single stream comprising a plurality of synchronized distinct feeds based on the determined synchronizing point. The method further includes encoding the single stream to form a composite mobile device compatible stream. The step of combining includes at least one of interleaving, multiplexing, and concatenating. The step of combining includes comprises delaying at least one of the plurality of distinct feeds so that the delayed at least one of the plurality of distinct feeds may be time synchronized with at least one other of the plurality of distinct feeds. The step of combining the plurality of distinct feeds includes sub-sampling at least one of the distinct feeds so that the composite mobile device compatible stream takes no more bandwidth than one of the distinct feeds. The stream may be one of a device specific stream, an audio/video player-specific stream, and a DASH-based stream. The at least one of the distinct feeds comprises a live event feed. The time stamp information for the live event feed may be the reference clock. The plurality of distinct feeds may be synchronized to the reference clock. The single stream may include a plurality of synchronized distinct feeds may be an internet protocol stream that comprises metadata for each of the distinct feeds. The metadata facilitates converting the single stream into the distinct feeds for presentation on a mobile device screen. The metadata facilitates identifying each of the distinct feeds to a user interface application of a mobile device on which the distinct feeds are being presented. The single stream may include a plurality of synchronized distinct feeds including a mosaic of the plurality of the distinct feeds. The single stream includes a mosaic further comprises position information within the mosaic of each distinct feed. The single stream includes a plurality of distinct feeds further including a plurality of video feeds and a single audio feed associated with one of the plurality of video feeds.

The methods and systems described herein may include accessing with a server a plurality of distinct feeds comprising at least one of audio and video and further comprising a sequence of frames. The method includes accessing time stamp information for at least a portion of the plurality of distinct feeds. The method includes comparing each of the time stamp information to a reference clock to determine a relative order of, and a relative time difference among, the portion of the plurality of distinct feeds. The method includes determining a synchronizing frame in each of the plurality of distinct feeds at which each may be synchronized relative to the reference clock. The method includes combining the frames of the plurality of distinct feeds to form a single stream comprising a plurality of synchronized distinct feeds based on the determined synchronizing frame. The method further includes encoding the frames of the single stream to form a composite mobile device compatible stream. The step of combining comprises at least one of interleaving, multiplexing, and concatenating. The combining includes delaying at least one of the plurality of distinct feeds so that the delayed at least one of the plurality of distinct feeds may be time synchronized with at least one other of the plurality of distinct feeds. The step of combining the frames of the plurality of distinct feeds includes sub-sampling each of the distinct feeds so that the composite mobile device compatible stream may take no more bandwidth than one of the distinct feeds. The stream may be one of a device specific stream, a player-specific stream, and a DASH-based stream. The at least one of the distinct feeds includes a live event feed. The time stamp information for the live event feed may be the reference clock. The plurality of distinct feeds may be synchronized to the reference clock. The single stream may includes a plurality of synchronized distinct feeds may be an internet protocol stream that comprises metadata for each of the distinct feeds. The single stream includes a plurality of synchronized distinct feeds including a mosaic of the plurality of the distinct feeds. The single stream includes a mosaic further including position information within the mosaic of each distinct feed. The single stream may include a plurality of distinct feeds further including a plurality of video feeds and a single audio feed associated with one of the plurality of video feeds.

The methods and systems described herein may include receiving in a mobile device a single video stream comprising a plurality of time synchronized distinct video feeds. The method includes accessing, in a memory of the mobile device, a distinct video feed selection criteria that may indicate one or more of the plurality of time synchronized distinct video feeds for presenting to the user. The method includes selecting a portion of the plurality of time synchronized distinct video feeds received in the single video stream based on the accessed distinct video feed selection criteria. The method includes presenting the selected portion to a user of the mobile. The distinct video feed criteria may be one of location of the mobile device, content subscription associated with the mobile device, identification of a network carrier providing service to the mobile phone, and user selection of one of the distinct video feeds. The method further includes presenting the selected portion comprises arranging the selected portion into a unified mosaic display. The unified mosaic display includes alternate content for any distinct video feed not included in the selected portion.

The methods and systems described herein may include receiving a plurality of distinct video feeds and video feed time information that facilitates determining a relative order of the distinct video feeds. The method includes accessing a distinct video feed selection criteria that indicates one or more of the plurality of time synchronized distinct video feeds. The method includes selecting a portion of the plurality of distinct video feeds based on the accessed distinct video feed selection criteria. The method includes combining the selected portion of the plurality of distinct video feeds in the relative order. The method includes generating a mobile device compatible stream from the ordered, combined plurality of distinct video feeds by processing the ordered, combined plurality of distinct video feeds with an mobile device compatible encoder. The distinct video feed criteria may be one of location for viewing a distinct video feed, content subscription, identification of a network carrier providing service over which the mobile device compatible stream may have to be transmitted, and user selection of one of the distinct video feeds. The step of combining may include at least one of interleaving, multiplexing, and concatenating. The step of may include delaying at least one of the plurality of distinct video feeds so that the delayed at least one of the plurality of distinct video feeds may be time synchronized with at least one other of the plurality of distinct video feeds. The step of combining the plurality of distinct video feeds includes sub-sampling each of the distinct video feeds so that the composite mobile device compatible stream takes no more bandwidth than one of the distinct video feeds. The stream may be one of a device specific stream, a video player-specific stream, and a DASH-based stream. The at least one of the distinct video feeds may include a live event feed. The single video stream may include a plurality of synchronized distinct video feeds may be an internet protocol stream that may include metadata for each of the distinct video feeds. The single video stream may include a plurality of synchronized distinct video feeds including a mosaic of the plurality of the distinct video feeds. The single video stream includes a mosaic further including position information within the mosaic of each distinct video feed. The single video stream may include a plurality of synchronized distinct video feeds further including a single audio feed associated with one of the plurality of synchronized distinct video feeds.

The methods and systems described herein may include receiving a selection of a live video feed comprising a plurality of video frames, wherein the live video feed includes time information associated with each frame. The method includes accessing the time information associated with a current frame of the selected live video feed. The method further includes querying a server that generates a feed of event real-time properties data frames to determine an event real-time properties data frame that may correspond to the time information associated with the current frame of the selected live video feed. The method includes retrieving the determined event real-time properties data frame. The method includes presenting the determined event real-time properties data frame with the current frame of selected live video feed on an audio/video user interface of a mobile device. The step of presenting the determined event real-time properties data frame includes displaying a leaderboard display comprising the event real-time properties data in a predefined format. The method further includes presenting subsequent frames of the selected live video feed and the event real-time properties data until at least one of a new live video feed may be selected or an error conditions occurs.

The methods and systems described herein may include receiving a user selection through a user interface of a mobile device of a live video feed. The method further includes receiving the live video feed over a mobile device radio network in response to the user selection. The method further includes retrieving with the mobile device a latest leaderboard frame that may be periodically generated with a server based on event real-time properties data received by the server. The method further includes presenting the live video feed as it may be received along with each latest leaderboard frame as it may be retrieved, wherein the presented latest leaderboard frame lags the presented live video feed by less than three seconds.

DETAILED DESCRIPTION

Figure 1:
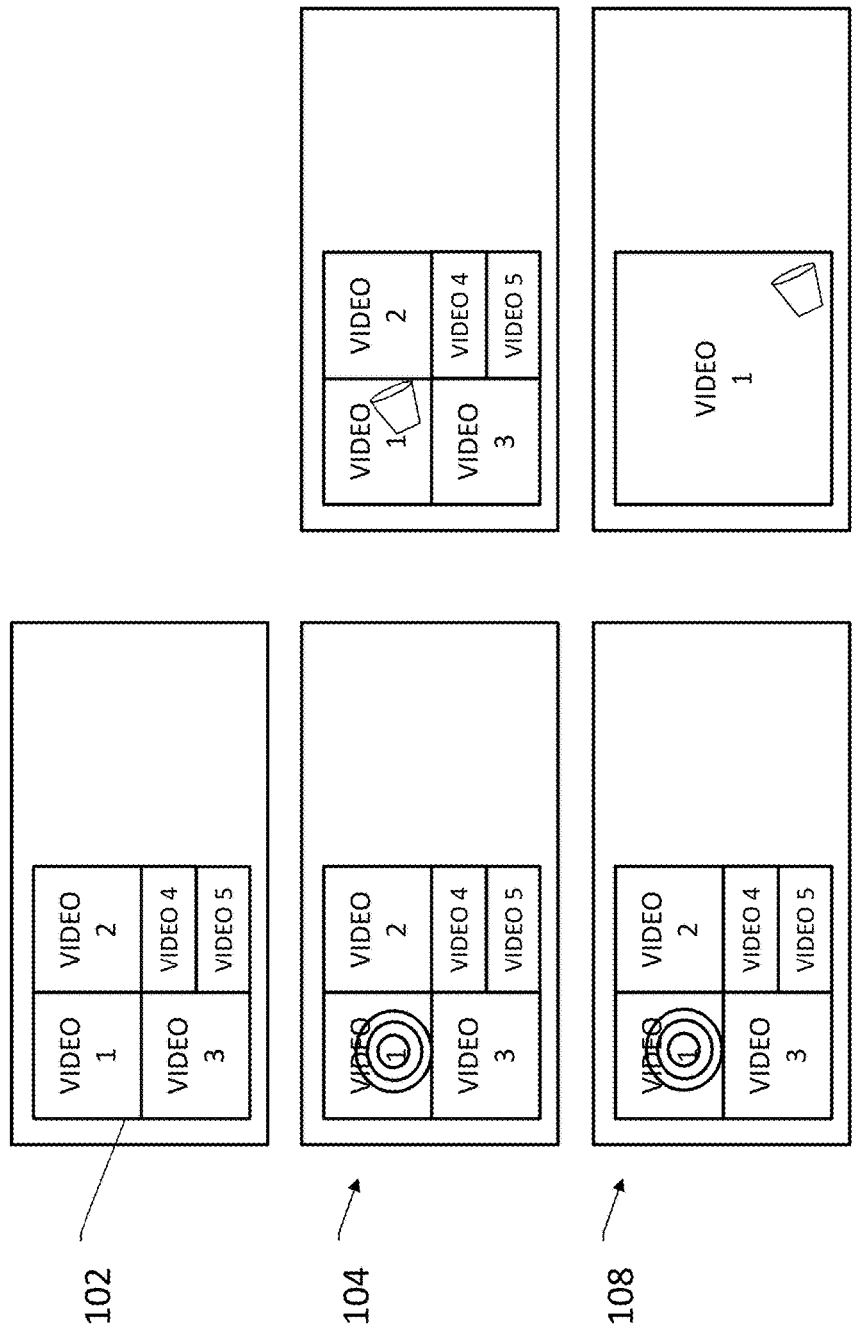
FIG. 1 depicts a user interface for displaying multiple distinct video feeds on a mobile device that were streamed to the device in a single stream.

The methods and systems described herein improve mobile IP network bandwidth utilization. Instead of a mobile device needing to decode a separate stream for each of a plurality of video feeds at once to maintain a coherent display (and the network having to provide bandwidth for separate streams), a server ingests all relevant feeds and creates mobile-device compatible stream (e.g. a time synchronized stream) of a select subset of the ingested feeds for delivery over the mobile IP network. A device receives the single stream and a single player decodes and presents the stream as a single video and audio presentation. This reduces network bandwidth demand by a factor roughly equivalent to the number of feeds that are combined into one stream and reduces device processing load by a similar amount (decoding one stream instead of decoding and arranging all of the separate streams in one display).

In an example of presenting four games taken from four distinct game feeds on one screen of a mobile device, if each game were streamed separately over a mobile network, each would need 1 Mbps of network and decoding bandwidth, which equals 4 Mbps bandwidth demand on the network and device decoding of four streams for display at once. By combining (and optionally time synchronizing) the four game feeds into one stream, the net network and decoding bandwidth required for all four games is approximately the equivalent of a single separately streamed game or 1 Mbps, effectively reducing bandwidth demand by a factor of four.

With such dramatic bandwidth savings, unlocking enhanced functionality may result in significant improvements in user interfaces, such as: replacing a conventional simple scrolling text program guide with a dynamic scrolling guide that depicts video of the programs; view all news services on one screen rather than having to switch among news feeds; view a range of sports or all games for one sport on a single screen; display a user's favorite programs on one screen, and the like. These are merely exemplary improvements in mobile device user interface capabilities. It will be apparent that other improvements are also enabled through single streaming of a plurality of feeds as described herein.

Benefits of the methods and systems described herein may extend well beyond the reduction in bandwidth demand and processing overhead to accomplish displaying multiple feeds in a single region of a display. Although a plurality of feeds are streamed to a device as a single stream, each feed is presented in a portion of a display so that user actions (e.g. through a touchscreen, mouse and the like) within a feed-specific portions of the display screen may result in the user interacting with the specific feed as if the feed were being streamed directly to the device. In addition, a user action taken on any section of the multi-feed portion of the device display may result in a new view related to the section. Examples described herein include audio control, video control, and the like.

There are many benefits of these techniques. Through the novel techniques here that result in significant bandwidth conservation, network and processing bandwidth can be allocated for special features (e.g. commercialization of content, and the like). Likewise by requiring minimal device computing resources, even low processing power devices can incorporate advanced features such as screen-in-screen, video program guide, and the like. Similarly, by requiring less processing power, power drain is reduced because all of the computations to coherently combine the feeds are done before the device receives the stream. Beyond the device benefits, network providers gain benefits of consistent network load for streaming video to a device that is not dependent on the number of feeds being sourced, thereby alleviating network congestion for advanced video features like multiple programs being displayed simultaneously on a mobile device. When these features are combined with selective feed display capabilities in the mobile devices as described herein, broadcasting a multi-feed stream to be received by many devices may further reduce network bandwidth demand.

An exemplary user interface screen is depicted in in FIG. 1, which is described here. With a basic touch-screen mobile device, the user interface for this advanced functionality is surprisingly simple. Once the multi-feed/single-stream video functionality is launched, the screen can be filled with multiple feeds. FIG. 1 shows an exemplary five-feed screen display 102. By touching one of the displayed feeds when an audio selection function is active, the user can select audio for that feed to be played by the device 104. In this way, the multi-feed single stream user interface facilitates interactivity and cross combinations of audio associated with the feeds. By selecting one of the displayed feeds when a feed selection function is active, the user can enable that feed to take over the screen portion of the other feeds to form a single feed video 108. At any time the user can return to the multi-feed view to select another feed or the user can toggle through the feeds in single feed mode. These and many other user interface functions and features are envisioned and contemplated within the scope of this disclosure.

Examples include streaming live broadcast coverage of an event such as auto racing with multiple views: facing the driver, driver's view, aerial view, real-time statistics, and the like. Another example includes fantasy football in which a fantasy football player's team may be presented in some of the feeds and video of the games in which the team members are playing may be presented in other of the feeds. The user may be able to select among audio of the game feeds.

Multi-feed streaming may be associated with digital rights management of the streamed content. Each feed may be separately managed for digital rights so that only users with specific rights (e.g. a service plan that provides for a real-time statistics view) may view a rights-protected feed. Such protection can be accomplished in the mobile device player so that any unauthorized feed can be discarded or replaced with other content during playback. Alternatively DRM protection can be accomplished in a unicast environment by sending fewer feeds or by sending alternate content (e.g. an ad for the unauthorized feed/channel with plan pricing) when the target user is not authorized for the feed. Other methods of providing DRM protection and authentication per feed are possible including, geo-location based authentication, network-based authentication, and the like. In a live-sports example, certain feeds (e.g. replays) may be available to a mobile user who is located within a predefined radius of the playing field. Alternatively, mobile users within the predefined radius may be prohibited from viewing certain replays similar to what replays are shown on the venue projection screens.

Network providers may participate in authentication and permissions to receive a particular feed in a multi-feed stream. In an example, a carrier may provide high definition content but may limit access to this content to 4G users. Therefore, if a user is not a 4G user, his device may not be authorized to receive this content as one of the multi-feeds. The feed may be disabled by the device playback software or it may be replaced when the stream is prepared with content that the non-4G user is authorized to receive.

Figure 2:
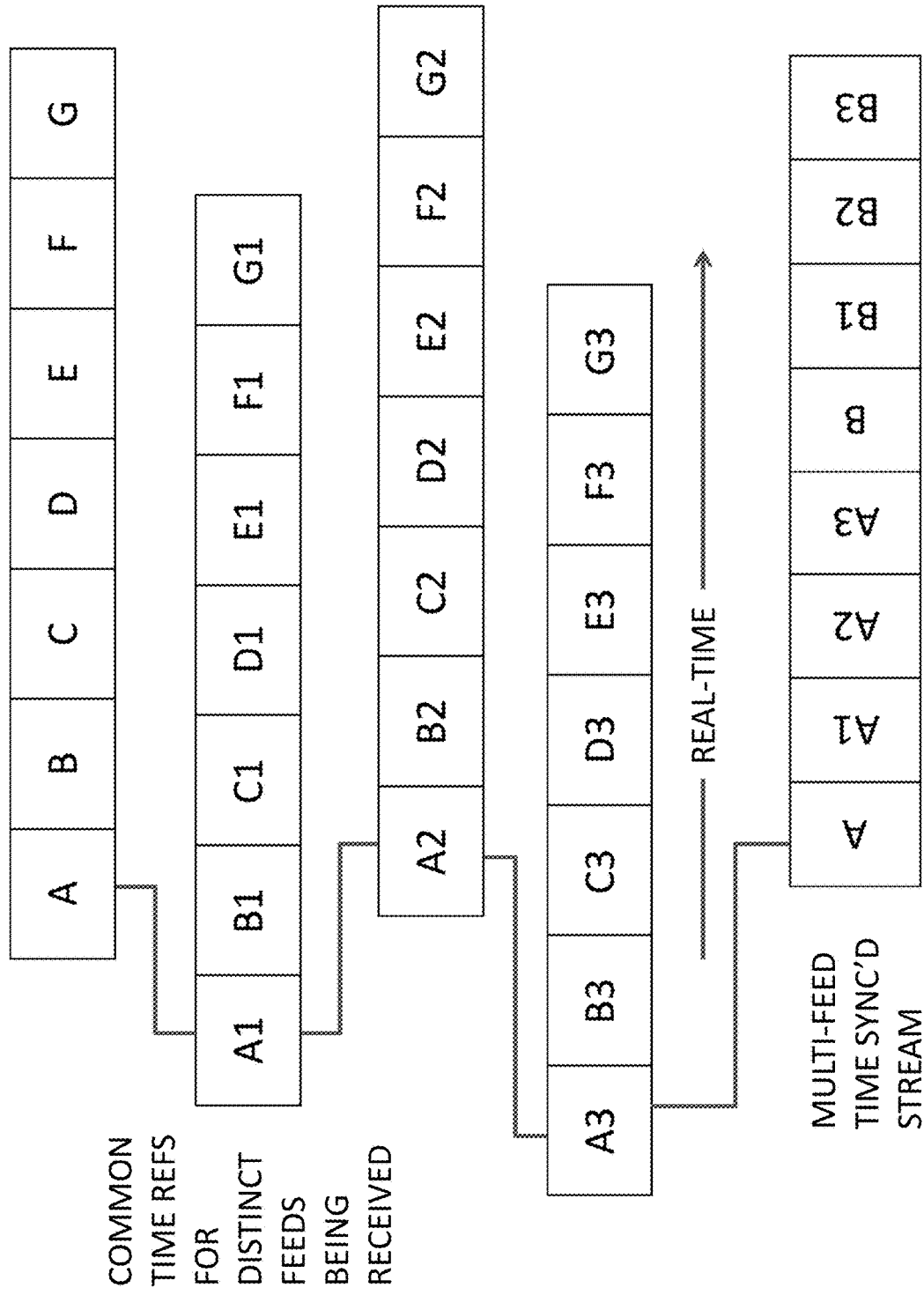
FIG. 2 depicts an embodiment of time synchronizing multiple distinct video fees into a single mobile device compatible stream.
Figure 3:
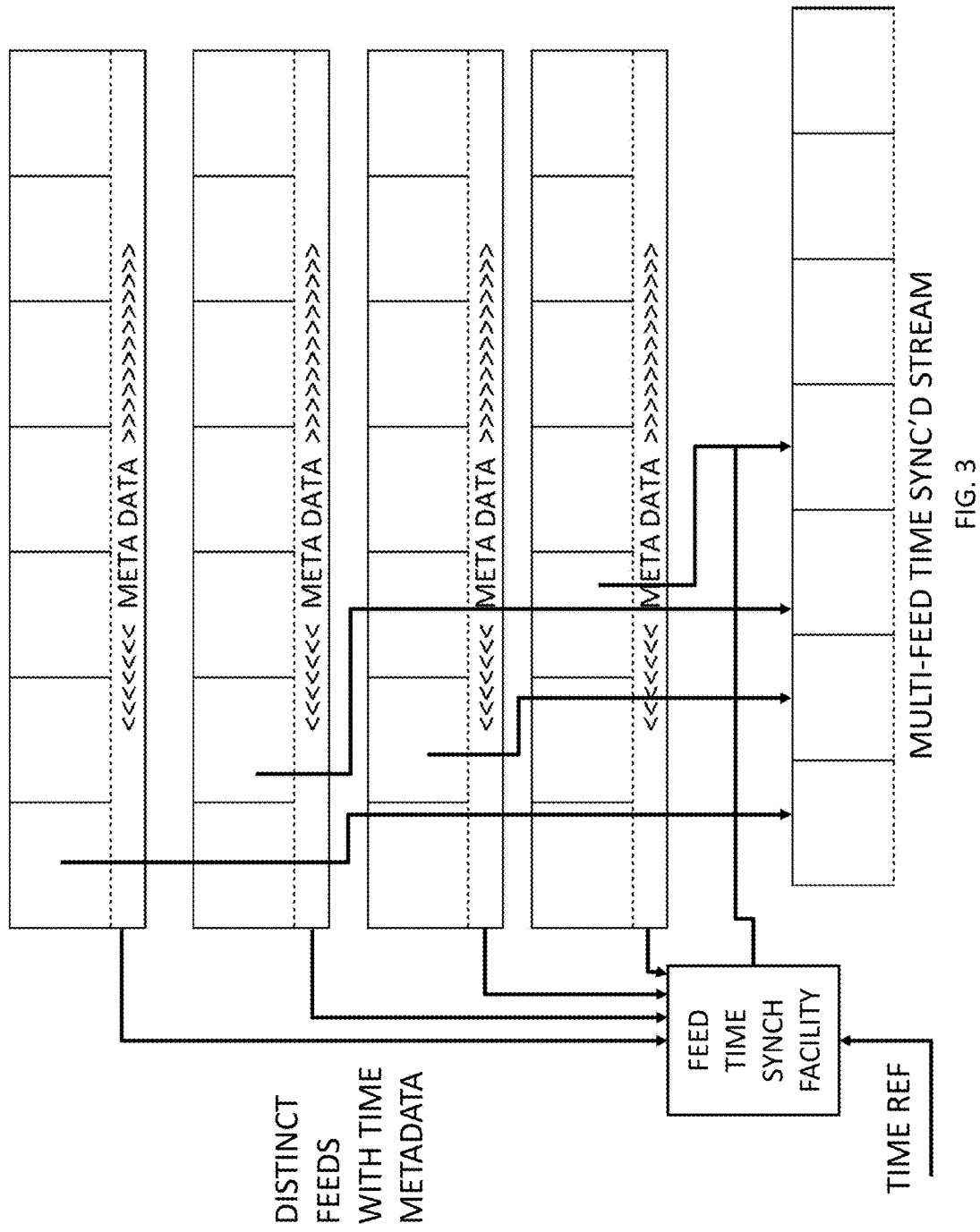
FIG. 3 depicts an alternate embodiment of time synchronizing multiple distinct video fees into a single mobile device compatible stream.

Synchronizing the distinct feeds and/or content from other sources that may be combined in the single stream or as metadata delivered with the stream may enable coherent display of the images and related information (e.g. real-time statistics, etc.). Synchronizing feeds may be done through a variety of techniques including capturing time information from the individual feeds and adjusting the relative timing of the feeds relative to the stream being delivered to the mobile device as depicted in FIG. 2. Alternatively, time references (e.g. RF satellite timing) may be used along with feed metadata to determine an appropriate time shift for each feed to properly synchronize the feeds into a single data stream to a mobile device as depicted in FIG. 3.

Synchronization in real-time may require satellite based references because reference timing from the video production trucks generally are not based on highly accurate clocks. One consideration is that latency is introduced in the feeds when the feeds are transmitted from the truck/base station to a satellite and then back to a receiving station for delivery to a mobile media platform that provides the multi-feed single-streaming described herein. Therefore other time sources may need to be employed for accurate locking of synchronized streams, such as GPS time, Network Time Protocol time, Internet time, venue local time, time replicated from other content from the same venue or location, time taken from another video stream, and the like.

One technique of using a reference clock may be to determine the clock that the feed itself is set to; make sure that the network time is in synch with the video time-video; and then insert the time synchronization data in a way that may be similar to inserting close captioning information.

When video feeds from different cameras at a single event (e.g. a car race) are to be added to the Mosaic display, the video sources are preferably synchronized in time before encoding of the mosaic is performed. This may be important to ensure that common events occurring in both video feeds appear to occur at the same time to the viewer. Therefore, time stamping video as it is captured at the event or at least when it is transmitted from the event to a video server may be required. This source-based time stamping also eliminates any need to compensate for latency of one camera feed relative to the other because both feeds can be locked so that they are fed into encoding synchronized. The principles of source-based time synching of video feeds are now described in greater detail.

During live encoding, the encoder may stamp every video frame with a date/time stamp. Local venue time (e.g. GPS time) may be used by the encoder to configure the date/time stamp automatically into the video. This date/time stamp may be received by an appropriate application running on a mobile device or the like in the header portion of the stream. The header is not viewable by the user, but is discoverable by the application.

Within the application a listener process may be continuously scanning the header of the video stream being received to find the date/time stamp. When a user selects one of the videos that are being presented to the user, the corresponding time stamp will be captured. When the date/time stamp is captured, the application queries a separate event real-time properties (ERP) feed as described herein to find a corresponding date/time frame that is close in time to the captured time stamp. A difference between the date/time frame and the time stamp of a few seconds is typical since it takes about one second to create a leader board frame utilizing event real-time properties data.

Until a corresponding date/time frame is retrieved, the selected video plays normally. Once a date/time frame that corresponds to the video time stamp is received, a leaderboard with the pertinent ERP update is displayed to the user as a fully synced viewing experience of the ERP data showing in the leaderboard and the video stream that is playing. Once the two feeds are synchronized, there may be no additional latency between the video and the ERP data to deal with. Once the user selects a new video, this process repeats. Note that generally, it will take approximately one second for the synced event real-time properties data to load into the application.

Once a time match between ERP data and the video feed is established the application continues to monitor that the data is in sync by validating the date/time match at less frequent intervals (e.g. ten second intervals) throughout the video play.

This date/time ERP and video frame synching may be active whenever video (e.g. live video from an event such as a sports event) is being presented in the video feed. However, when there is no live video in the feed or the user has selected a feed that does not include video or has selected no feed, the application may default to use the most current (low latency/latest frame) event real-time properties data. This is described further with respect to FIG. 4. A similar action may be taken by the application when the user pauses the video, exits the video, starts a new video or if the video fails for some reason. Therefore, when a selected video is playing, the video time stamp is the master clock to which the other date/time frame data is synchronized. When no video is playing, the application defaults to using the most current event real-time properties data available (e.g. sub-5 second low latency feed). If the user stops/pauses the video, the application will switch to display the most current event real-time properties data to the user.

Once the user resumes playback, the application performs the time sync operation described above so that the user is shown delayed event real-time properties data that is time synchronized with the video playing. Optionally a message may be sent to the user when this condition exists (e.g. resumed playback).

A composite single multi-video feed may also have a time stamp to facilitate syncing the event real-time properties data. As is described elsewhere herein, the videos within single multi-video feed are first synced to each other and then encoded and wrapped with a video timing header based on the date/time stamp of a reference or master clock, such as one generated by or received from the production truck. This date/time stamp is then passed in the composite video feed header to a client application as noted above and used to synch the event real-time properties data similarly to that described above.

A master clock for time stamping video feeds and for synchronizing video and ERP data may be derived from a clock source at a local venue. Sources of master clock include GPS referenced time, network time protocol time (NTP), and the like. Generally video feeds and ERP data generated from a single event are time stamped based on the same master clock. Because video feeds and ERP data may be sourced from two different processing sub systems at an event (e.g. a production truck and a ERP server), clocks in these two sub systems are themselves synchronized so that each frame from each source can be matched in time. As noted above, a master clock for ERP frame data synchronization may be the clock time stamp in the video feed header.

In the event of an error condition, certain actions may result to ensure a smooth user viewing experience. In an example error condition, a video feed may stop unexpectedly. For this condition, as noted above, the ERP data source will be changed to the most current (low latency) frame data. In another example error condition, a video feed header may not include a time stamp. For this condition, the ERP data source becomes the most current (low latency) frame data. During this condition, the video and the ERP leaderboard data may not be synchronized and there may be no way to determine the latency between the video feed and the ERP data feed. In yet another example error condition, an ERP data feed may go down or not be detectable. For this condition, the most recently received ERP data frame is continuously displayed until the ERP feed is restored.

Synchronizing a portion of the distinct feeds and/or content from other sources is also envisioned. Selective feed synchronization may be implemented. A single stream may include feeds and/or content that does not necessarily need to be synchronized. In an example, a video program guide may receive feeds from a plurality of channels and may present a portion of these feeds in a display of a mobile device as a video program guide. Other than combining each feed as it is ingested into a single stream, synchronization among the feeds may not be required. An alternate video program guide embodiment may include presenting a program guide along with a larger display of a currently selected feed/program. In such an embodiment, the individual video feeds in the program guide may not be synchronized to each other but the currently selected feed/program in the larger display may be synchronized to its smaller version in the video program guide.

In another embodiment of selective feed synchronization, a live event, such as an auto race may include feeds from several vantage points in the race arena (e.g. views from several cars). A single stream of such an event may include these live feeds as well as content related to leader board details, information about a driver who's view is being presented in one of the other feeds, and the like. In such scenarios, the driver views may be synchronized so as to ensure that these display are coherent in time. However, the non-real-time content of a leader board or of driver details may not be synchronized to ensure fine grain coherency. A user may be presented with three driver views and a fourth view of driver details. When a user selects a driver view, the details of the driver may be presented in the fourth view.

When using a mobile device at a live event to also view the video feed of the event, some latency between when the live event occurs and when that same live event will be presented on the mobile device may be expected. This may be referred herein to low latency viewing. However, data associated with the live event may be made available before the video feed can be propagated from the event through the wired and wireless networks to the user's mobile device. Therefore it may be desirable to give the user the option of forcing the presentation of event data to be delayed so that it can be presented with the video feed of the live event, or allowing the live event data to be presented as soon as it is available. Both options are possible because time stamps are being inserted in both the video feed and the event data feeds so these time stamps can be used to synchronize presentation if that is the preferred user experience. Further details regarding low latency viewing are presented below. Although the following embodiments reference a live track event, the methods and systems related to low latency viewing can be applied to any live event.

A first embodiment of low latency viewing may include a sequence of events as follows. Note for this embodiment the client app may proactively ask the server to identify the latest frame of leaderboard information.

During a live event, event real-time property messages may be continuously posted to a video-processing server.

These messages may be processed by accumulating and modifying a full model of a leaderboard for the event by the server. On a one-second interval, the state of this model may be written out to a "frame" and that "frame" may be time-stamped and stored for later retrieval. Thus a "frame" may represent the state of the leaderboard data at a given point in time. The frame may be created as a file and made available to all client applications to "pull" data from it.

When the client application starts up its leaderboard view, it may query the server to determine the latest frame of leaderboard data identifier. The client application may then use this identifier to retrieve the latest frame, and display it as its leaderboard. The client application may refresh its data on a one-second rate as well.

Since the client application requests the latest frames available, the mobile device user may experience a short lag between live event activity, and what is displayed in the mobile device leaderboard. However latency includes delays of as much as five seconds associated with network time, processing time and content delivery network interfacing. Generally, a live event data feed is delivered from the event to a server in less than one second. Therefore, latency may range up to approximately six seconds, but is preferably in the range of two-three seconds.

Figure 4:
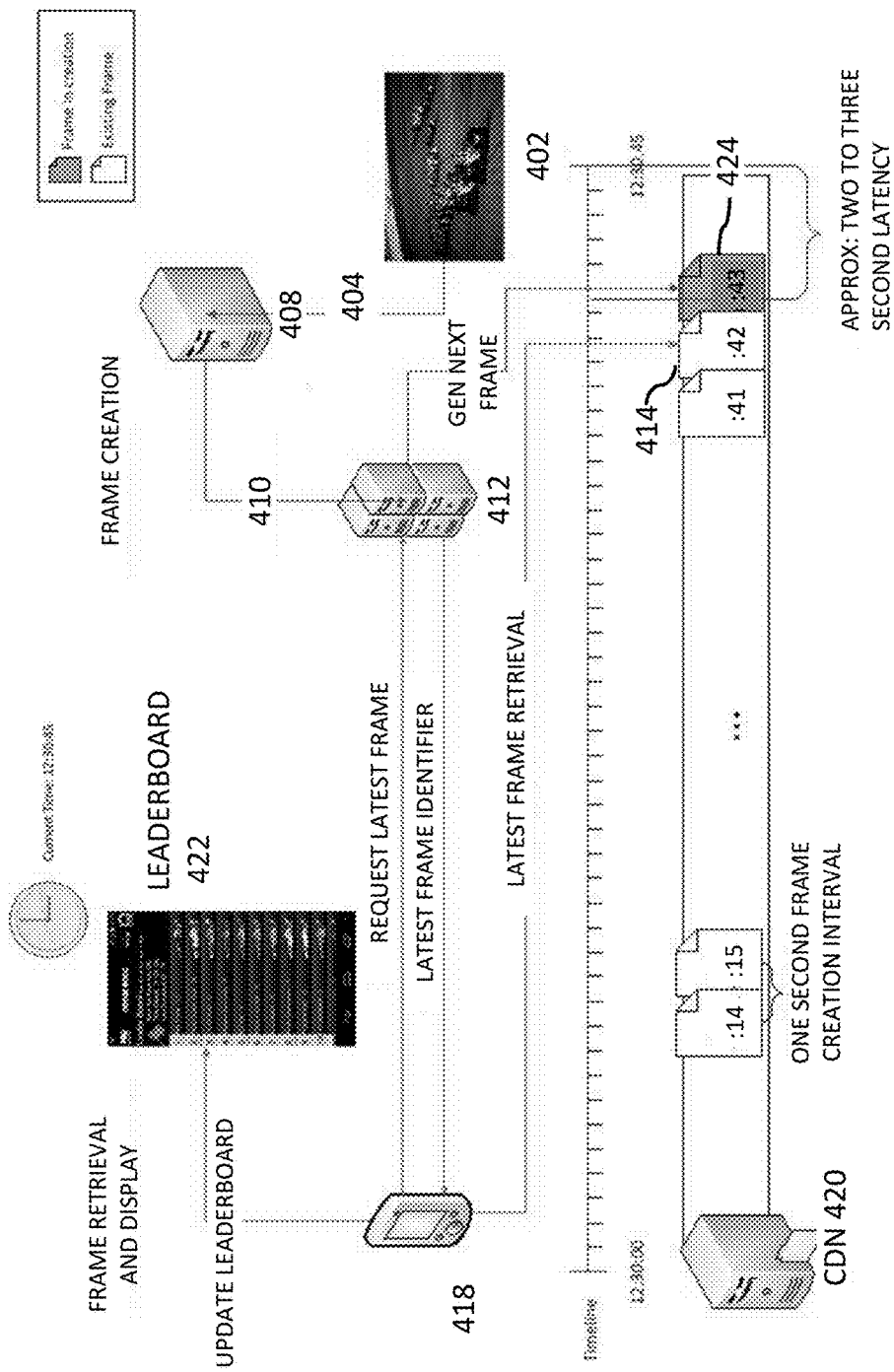
FIG. 4 depicts an embodiment of time synchronizing video and event real-time properties frames.

Referring to FIG. 4, which depicts the low latency embodiment described above, latencies associated with each aspect of feed generation, ingestion, processing, and delivery are depicted. A sporting event 402, such as an auto race is captured for broadcast and live timing and scoring data 404 is provided to an event real-time properties (ERP) generator 408 that streams ERP data 410 to a media processor 412. The media processor 412 generates a series of frames and designates the most recently generated as the "latest" frame 414.

Meanwhile a mobile device 418 requests this latest frame 414 from the media processor 412, which responds with information that the mobile device 418 can use to retrieve the latest from 414 from the content delivery network (CDN) 420. The mobile device 418 retrieves this latest frame 414 from the CDN 420 and updates it's display of a leader board 422. Note that the displayed latest time (e.g. 12:30:45) may be close to, but generally later than the creation time (e.g. 12:30:42) of the latest frame 414. In parallel with this mobile device leader board update process, the media processor 412 is updating its frame data by generating a next frame 424. In this example, frames are generated on one-second intervals, although other intervals are contemplated and included herein.

Depicted along with the CDN 420 is a timeline showing the relative positioning of each latest and next frame with respect to the current time to facilitate depicting a potential latency of two-three seconds from event capture to device updating.

A second embodiment of low latency may be no different from the user experience point of view; however a different implementation can lower the latency even further. From a design perspective this feature pushes data at a regular interval. A sequence of events for this embodiment is as follows:

During a live event, event real-time properties messages are received by the media processor 412. This data is processed by accumulating and modifying a full model of the leaderboard. On a configured interval (e.g. multiple times per second), the state of this model is written out to a frame (e.g. as a latest frame 414) in the CDN 420. This frame is time-stamped and stored for later retrieval (e.g. for time synchronization purposes, or any possible future race replay features). This frame is also pushed out to all listening client devices 418.

When the client application on the mobile device 418 starts up its leaderboard 422 view it may continuously listen for leaderboard frames that are pushed to it. When the client application receives a frame it directly displays that frame as its leaderboard.

Since the latest frames 414 are always being pushed to the client application, the application does not have to request latest frame information and then retrieve it from the CDN, which further reduces the lag between real life and what is displayed in the leaderboard. Therefore, this embodiment bypasses the CDN 420 to further minimize the latency.

In either of the above embodiments, telemetry data points may be built into the leaderboard data frames along with all of the other leaderboard data points. For both embodiments, the refresh rate for telemetry fields may be 1 second, or the same as a frame generation interval. For the first embodiment, the latency of the telemetry fields could be up to approximately six seconds (taking into account video provider latency as well). For the later embodiment, the latency of the telemetry fields could be up to approximately two seconds (again, taking into account video provider latency).

There may be embodiments in which none of the feeds are synchronized as described herein. Other embodiment may include synchronizing two or more of the feeds. Yet other embodiments may include synchronizing all of the feeds that are combined into a single mobile IP network compatible stream.

There may be embodiments in which feeds in a first stream are synchronized with feed(s) in a second stream so that screens on multiple devices may be synchronized. One such embodiment may include a live auto race event being broadcast on a first stream and presented on a large screen that many viewers can view. Individual mobile devices that are in proximity to this screen may receive a multi-feed stream that includes the large screen feed. The feed that is streamed to the large screen and to the mobile devices may be synchronized by the methods and systems described herein. In this way mobile device users that are in proximity to the large screen do not experience any delay in the presentation of the common feed.

Processing multiple feeds to generate a single stream thereof may include accessing and/or processing metadata and/or source information (e.g. URL) about the feeds. This information may be useful in controlling display of the feeds, such as when switching between multiple feeds being presented on the device display (e.g. in a Mosaic) to just a single feed being presented or some other combination of feeds being presented (e.g. changing from two to three feeds). Other uses of metadata may relate to positioning of the feeds in the mosaic, and the like. Source data, particularly URL data, may be presented or selectable by a user to enable access to the URL content separately from the mosaic interface functionality.

Multi-feed single-stream video and audio may be compatible with existing IP protocols such as HLS, and future standards such as DASH, and the like. DASH and the like may facilitate enhanced live video adaptive streaming such as providing streams in chunks of time (e.g. 10 seconds). These chunks may be further processed by the methods and systems herein, including enhancements to mobile device stream players to split these chunks into the individual feeds and some contextual information that the player recognizes. In an example, the mobile device player may be configured to detect contextual information at the three-second point in each chunk. In an example, information such as an advertisement, leader board information, and other content may be included in the stream at this three-second time and the mobile device player may extract this information and present it appropriately to the user (e.g. an updated leader board display, and the like.

Synchronization considerations may include startup related effects when a user opens up a screen and starts selecting feeds. Due to network latency, there may be noticeable delays between when a user selects a feed and it is presented to the user. These delays may extend further when the feed(s) need to be synchronized. This may be further complicated by the inclusion of alternately sourced content (e.g. a leader board from a website or other such content) that may be separately updated. Therefore there may be some period of time as a user switches context (e.g. changing feed selections) that metadata being provided with the stream (e.g. to update a leader board) may be perceived by the user to be "out of sync" with the feeds. One option is to delay streaming of data until all of the required data is ready to be streamed. Using the longest detected latency of the feeds may do this. Alternatively, the mobile device player may participate in this non-real-time synchronization and may receive metadata that may facilitate the device player providing the proper coordination of live feeds and non-live content updates. Alternatively video and other content may be delivered as one or more sets of files that the mobile device player could process and present in a coherent manner. Consideration for enhanced mobile IP streaming standards such as DASH is also included herein so that capabilities related to IP streaming, containerization, and the like provided by these standards may be effectively incorporated herein to provide the benefits to the network provider and device user as described and envisioned herein.

Figure 5A:
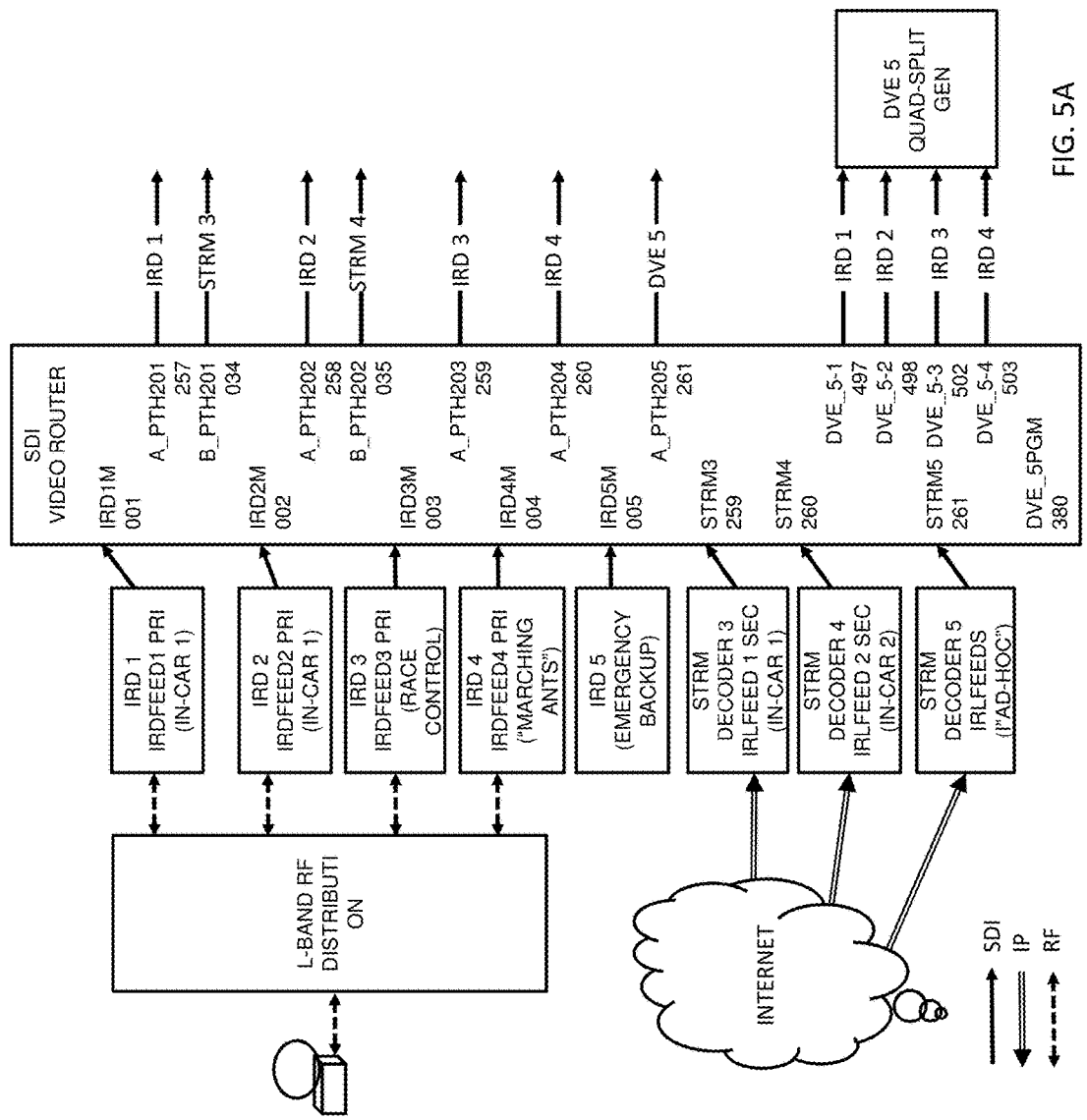
FIGS. 5A and 5B depict a live race event application of streaming a plurality of video feeds in a single stream over a mobile device network.
Figure 5B:
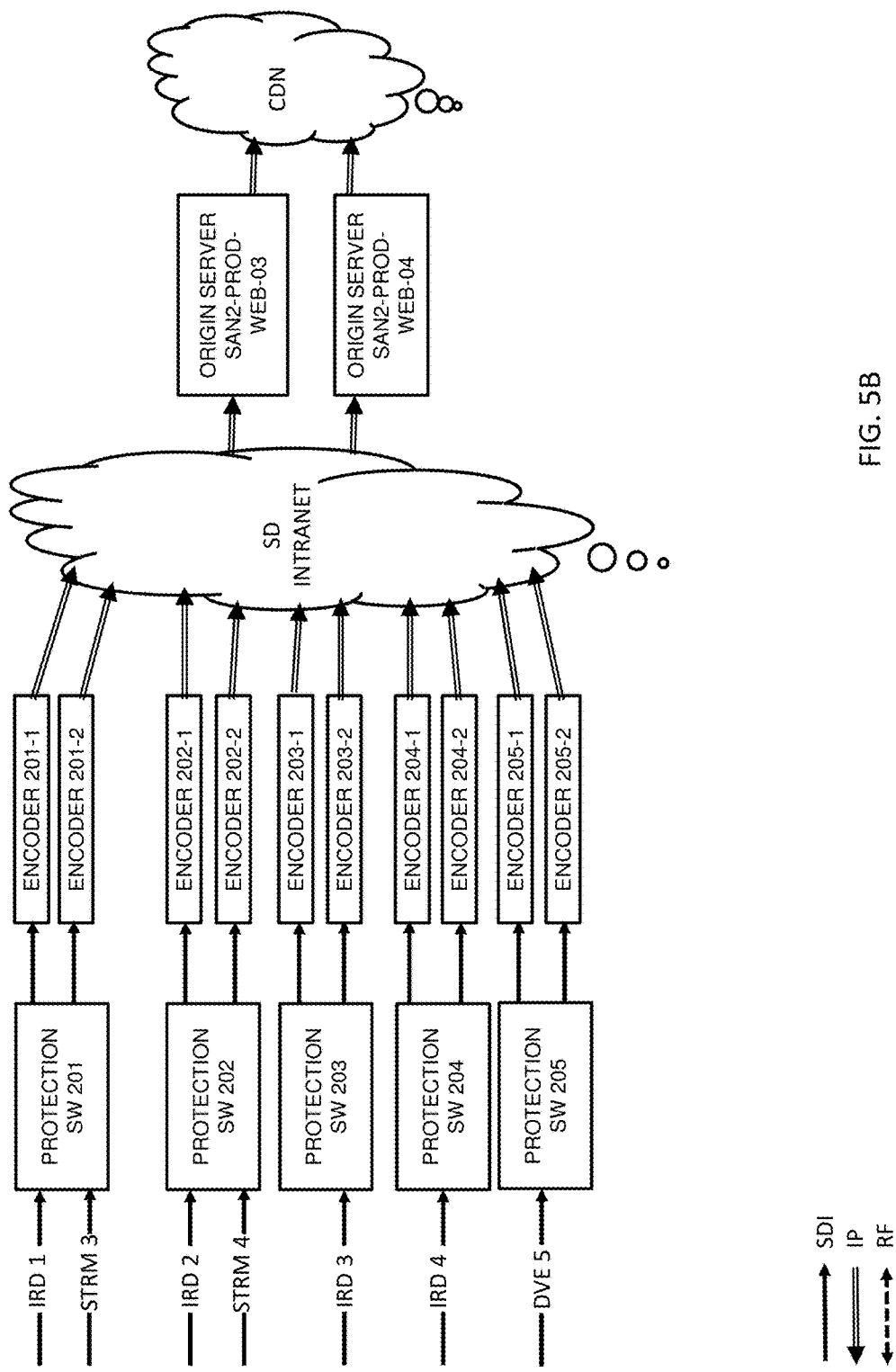

Referring to FIGS. 5A and 5B, an application of the multi-feed single-stream methods and systems described herein is depicted. Video feeds may be provided via a satellite and distributed through an L-band RF distribution facility (IRD 1 through 4). Other feeds may be provided from the Internet (STRM DECODER 3 through 5). A fifth IRD feed may be an emergency backup feed (IRD 5). All of these feeds may be presented to a Video Router. A portion of these feeds may be streamed as a single stream to a user's device to be presented in a coherent display as described herein. The video router may be configured to provide exemplary video routes including:

| ROUTE | INPUT > OUTPUT |
| --- | --- |
| IRLFEED1 PRI | IRD1m > APTH_201 |
| IRLFEED1 SEC | STRM3 > BPTH_201 |
| IRLFEED2 PRI | IRD2m > APTH_202 |
| IRLFEED2 SEC | STRM4 > BPTH_202 |
| IRLFEED3 | IRD3m > APTH_203 |
| IRLFEED4 | IRD4m > APTH_204 |
| MOSAIC OUT | DEV5_PGM > APTH_205 |
| MOSAIC IN 1 | IRD1m > DVE5-1 |
| MOSAIC IN 2 | IRD2m > DVE5-2 |
| MOSAIC IN 3 | IRD4m > DVE5-3 |
| MOSAIC IN 4 | IRD3m > DEV5-4 |

Figure 6:
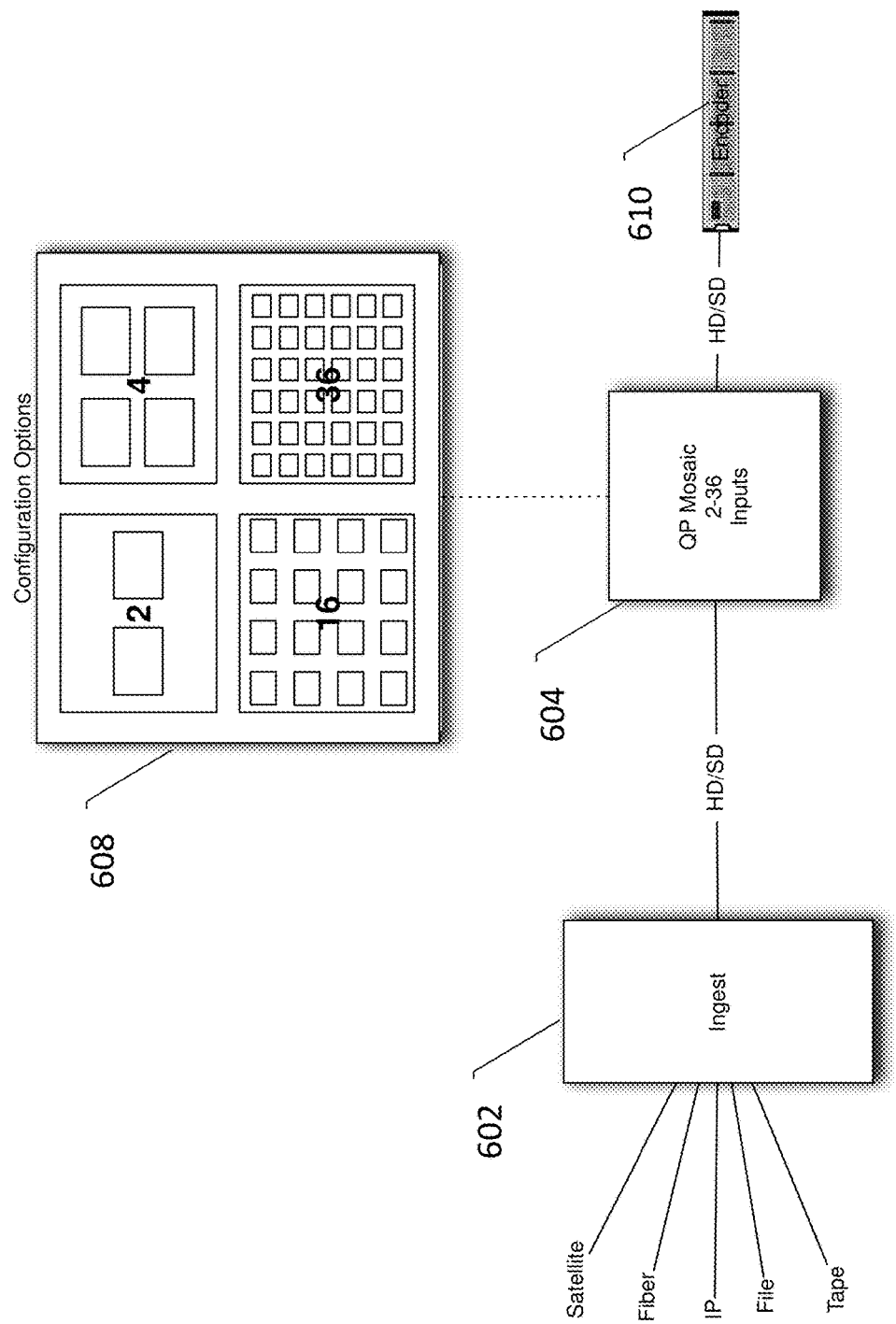
FIG. 6 depicts a block diagram of select components of a system that implements the methods of multi-feed mobile-network single streaming described herein.

Referring to FIG. 6, high-level features of a system for providing multiple feeds on a single mobile IP network stream are depicted. The system of FIG. 6 may receive 602 a plurality of feeds from sources including: satellite, fiber, IP, file, tape, and the like. These feeds may be ingested and delivered to a feed combining engine 604 that may access configuration options 608 that may determine the number of feeds to combine (e.g. 2, 4, 16, 36) and the sources to select. The feed combining engine 604 may provide a single stream of the combined feeds that may be provided to an encoder 610 for delivery to a device over a mobile IP network.

Figure 7:
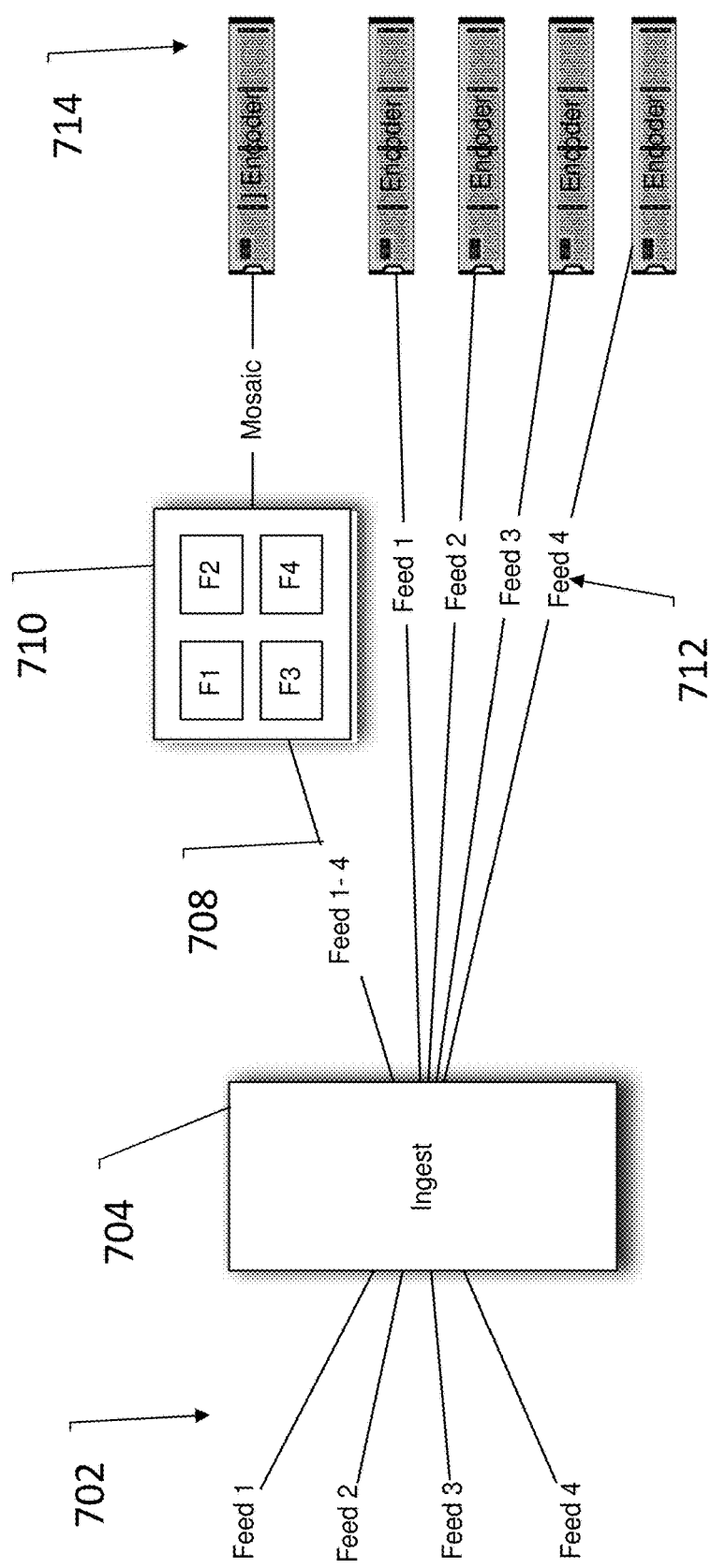
FIG. 7 depicts a diagram of an exemplary embodiment of receiving and providing distinct feeds as individual streams and as a single stream over a mobile device network.

Referring to FIG. 7, a plurality of feeds 702 may be received and processed by an ingestion engine 704. The ingestion engine 704 may also combine the feeds 702 into a single stream 708 that may be presented to the user as a mosaic 710. The ingestion engine 704 may provide this combined stream 708 and individual streams 712 of each of the feeds to encoders 714 for delivery to mobile device(s) over a mobile IP network.

Combining the streams may be accomplished by, for example, creating a single stream that consists of packets from a plurality of other streams, such as by interleaving, multiplexing, or concatenating such packets and retaining information for managing or tracking the combined streams, by multiplexing or otherwise combining signals from different streams, or other techniques for combining data streams. One method of combining includes scaling each feed to a smaller representative image that can be displayed in a mosaic as depicted in at least FIG. 1 herein before combining the scaled feeds into a single video while retaining individual identifiers of each feed and its location in the mosaic by way of meta-data that is used by the device to manage a particular feed (e.g. allowing a user to select a feed).

Another exemplary method of combining includes multiplexing multiple feeds into one video to produce a new video source that can be sent to an encoder to create a single channel (stream) with multiple pieces of content. In addition to combining feeds and generating a single video of the combined feeds, each individual feed may be delivered to an encoder so that when a user selects one of the feeds from the single stream, a larger (e.g. full screen) video of the selected feed can be streamed to the user's device without undue delay.

Although references herein include scaling and/or combining feeds prior to encoding, an encoding engine may be adapted to receive multiple source feeds, scale each as needed for the desired mosaic display, and create a single encoded stream to be delivered to a mobile device. Likewise, combining could be performed post encoding by each feed being sent to an encoder where the feed would be scaled to accommodate a mosaic display and a content delivery engine would combine the scaled encoded outputs into a single stream for delivery to a user device. A video player/application on the device could receive the stream and generate the mosaic from the distinct feeds in the stream.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated herein in their entirety by reference.

The invention claimed is:

1. A method comprising:
   accessing, by a processing system including a processor, a plurality of distinct feeds including a video feed of a live event;
   accessing, by the processing system, time stamp information for at least a portion of the plurality of distinct feeds;
   determining, by the processing system, by comparing each time stamp information to a reference clock a relative order of, and a relative time difference among, the portion of the plurality of distinct feeds;
   determining, by the processing system, a synchronizing point in each of the plurality of distinct feeds at which each is synchronized relative to the reference clock;
   accumulating, by the processing system, event data to generate a video object representing at least a portion of the event data;
   generating, by the processing system at a predetermined interval, a succession of frames each comprising a state of the video object; and
   combining, by the processing system, the succession of frames and the plurality of distinct feeds to form a single stream comprising a plurality of synchronized distinct feeds based on the determined synchronizing point in each of the plurality of distinct feeds, wherein the succession of frames is not synchronized.

2. The method of claim 1, further comprising encoding, by the processing system, the single stream to form a composite mobile device compatible stream.

3. The method of claim 1, wherein the single stream comprising a plurality of synchronized distinct feeds comprises a mosaic of the plurality of the distinct feeds.

4. The method of claim 1, further comprising replacing, by the processing system, at least one of the distinct feeds in the single stream with other content.

5. The method of claim 1, further comprising replacing, by the processing system, at least one of the distinct feeds in the single stream with an advertisement.

6. The method of claim 1, wherein at least one of the plurality of distinct feeds provides content associated with another one of the plurality of distinct feeds, and wherein the at least one of the plurality of distinct feeds is not synchronized to ensure fine grain coherency.

7. A system comprising:
   an ingestion facility of a media processing platform configured to receive a plurality of distinct feeds including a video feed of a live event;
   a media processor of the media processing platform configured to accumulate event data to generate a video object representing at least a portion of the event data, and further configured to generate, at a predetermined interval, a succession of frames each comprising a state of the video object; and
   a feed combining engine that is operationally connected to the ingestion facility and that produces a single stream comprising the succession of frames and a portion of the received plurality of distinct feeds that are provided by the ingestion facility, the feed combining engine further:
      accessing a feed clock associated with a source of at least one of the plurality of distinct feeds;
      accessing a reference clock; and
      determining by comparing the feed clock to the reference clock a latency between the at least one of the portion of the plurality of received distinct feeds and the reference clock, the portion of the received plurality of distinct feeds in the single stream being synchronized relative to the reference clock based on the determined latency, wherein the succession of frames is not synchronized.

8. The system of claim 7, wherein a frame of at least one of the distinct feeds comprises a synchronization point for a portion of the plurality of distinct feeds.

9. The system of claim 7, further comprising an encoding engine that encodes the single stream to form a composite mobile device compatible stream.

10. The system of claim 7, wherein the single stream comprises a mosaic of the portion of the plurality of the received distinct feeds.

11. The system of claim 7, wherein the feed combining engine replaces at least one of the distinct feeds in the single stream with other content.

12. The system of claim 7, wherein the feed combining engine replaces at least one of the distinct feeds in the single stream with an advertisement.

13. The system of claim 7, wherein at least one of the plurality of distinct feeds provides content associated with another one of the plurality of distinct feeds, and wherein the at least one of the plurality of distinct feeds is not synchronized to ensure fine grain coherency.

14. The system of claim 7, further comprising configurations options that are accessible by the feed combining engine to determine a number of the plurality of distinct feeds to combine and sources of the plurality of distinct feeds to combine.

15. A method comprising:
receiving, by a processing system including a processor, a single stream comprising a plurality of distinct feeds including a video feed of a live event, and distinct feed data time information, wherein the single stream takes no more bandwidth than one of the plurality of distinct feeds, the single stream further comprising a succession of frames generated at a predetermined interval, each comprising a state of a video object generated from accumulated event data;
determining, by the processing system, by comparing the time information for each of the distinct feeds a relative order of, and a relative time difference among, the plurality of distinct feeds;
determining, by the processing system, a synchronizing point in each of the plurality of distinct feeds at which each is synchronized; and
presenting, by the processing system, the plurality of distinct feeds and the succession of frames, wherein the plurality of distinct feeds is synchronized in time based on the synchronizing point and the succession of frames is not synchronized.

16. The method of claim 15, wherein the synchronizing point in each of the plurality of distinct feeds is associated with a single time value.

17. The method of claim 15, wherein the single stream is presented as a mosaic of the plurality of the distinct feeds.

18. The method of claim 15, further comprising presenting, by the processing system, other content associated with at least one of the distinct feeds in the single stream.

19. The method of claim 15, further comprising presenting, by the processing system, an advertisement associated with at least one of the distinct feeds in the single stream.

20. The method of claim 15, wherein at least one of the plurality of distinct feeds provides content associated with another one of the plurality of distinct feeds, and wherein the at least one of the plurality of distinct feeds is not synchronized to ensure fine grain coherency.

* * * * *